(12) United States Patent
Ota et al.

(10) Patent No.: US 10,252,377 B2
(45) Date of Patent: Apr. 9, 2019

(54) AQUEOUS ALUMINUM BRAZING COMPOSITION

(71) Applicant: HARIMA CHEMICALS, INCORPORATED, Kakogawa-shi, Hyogo (JP)

(72) Inventors: Yasuo Ota, Kakogawa (JP); JinYu Piao, Kakogawa (JP)

(73) Assignee: HARIMA CHEMICALS, INCORPORATED, Kakogawa-Shi, Hyogo (JP)

( * ) Notice: Subject to any disclaimer, the term of this patent is extended or adjusted under 35 U.S.C. 154(b) by 195 days.

(21) Appl. No.: 14/782,832

(22) PCT Filed: Apr. 2, 2014

(86) PCT No.: PCT/JP2014/059742
§ 371 (c)(1),
(2) Date: Oct. 7, 2015

(87) PCT Pub. No.: WO2014/168057
PCT Pub. Date: Oct. 16, 2014

(65) Prior Publication Data
US 2016/0052092 A1 Feb. 25, 2016

(30) Foreign Application Priority Data

Apr. 9, 2013 (JP) .................. 2013-081066

(51) Int. Cl.
*C22C 21/00* (2006.01)
*B23K 35/02* (2006.01)
(Continued)

(52) U.S. Cl.
CPC ........ *B23K 35/0222* (2013.01); *B23K 1/0012* (2013.01); *B23K 1/203* (2013.01);
(Continued)

(58) Field of Classification Search
CPC .............. B23K 35/0222; B23K 35/286; B23K 35/3613
See application file for complete search history.

(56) References Cited

U.S. PATENT DOCUMENTS

| 3,708,449 A | 1/1973 | Ippolito et al. |
| 5,483,012 A | 1/1996 | Midogohchi et al. |
| 2008/0026233 A1* | 1/2008 | Kunz ............... C09D 5/084 428/457 |

FOREIGN PATENT DOCUMENTS

| DE | 102010041436 A1 | 3/2012 |
| JP | 6-285682 A | 10/1994 |

(Continued)

OTHER PUBLICATIONS

Extended Search Report issued by the European Patent Office in corresponding European Patent Application No. 14782208.4 dated Oct. 31, 2016 (8 pages).
(Continued)

*Primary Examiner* — Veronica F Faison
(74) *Attorney, Agent, or Firm* — Buchanan, Ingersoll & Rooney PC

(57) ABSTRACT

An aqueous aluminum brazing composition contains, as a binder resin, a water-soluble/dispersible polyurethane resin that exhibits a residual ratio of 60% by mass or less in a 400° C. heating environment and exhibits a residual ratio of 1.0% by mass or less in a 520° C. heating environment.

9 Claims, 1 Drawing Sheet

(51) Int. Cl.
| | |
|---|---|
| B23K 1/00 | (2006.01) |
| B23K 1/20 | (2006.01) |
| B23K 35/28 | (2006.01) |
| B23K 35/36 | (2006.01) |
| C08G 18/48 | (2006.01) |
| C08G 18/66 | (2006.01) |
| C08G 18/72 | (2006.01) |
| C08G 18/73 | (2006.01) |
| C08G 18/75 | (2006.01) |
| C08G 18/08 | (2006.01) |
| C08G 18/32 | (2006.01) |
| C08G 18/34 | (2006.01) |
| C08G 18/42 | (2006.01) |
| C08G 18/44 | (2006.01) |
| B23K 101/14 | (2006.01) |
| B23K 103/10 | (2006.01) |

(52) U.S. Cl.
CPC ............ *B23K 35/286* (2013.01); *B23K 35/36* (2013.01); *B23K 35/3612* (2013.01); *B23K 35/3613* (2013.01); *C08G 18/0823* (2013.01); *C08G 18/3206* (2013.01); *C08G 18/348* (2013.01); *C08G 18/4202* (2013.01); *C08G 18/4238* (2013.01); *C08G 18/44* (2013.01); *C08G 18/4808* (2013.01); *C08G 18/4825* (2013.01); *C08G 18/4879* (2013.01); *C08G 18/6659* (2013.01); *C08G 18/6692* (2013.01); *C08G 18/722* (2013.01); *C08G 18/73* (2013.01); *C08G 18/755* (2013.01); *C08G 18/758* (2013.01); *C22C 21/00* (2013.01); *B23K 2101/14* (2018.08); *B23K 2103/10* (2018.08)

(56) References Cited

FOREIGN PATENT DOCUMENTS

| | | |
|---|---|---|
| JP | 7-150079 A | 6/1995 |
| JP | 8-257790 A | 10/1996 |
| WO | WO 2012/005351 A1 | 1/2012 |

OTHER PUBLICATIONS

International Search Report (PCT/ISA/210) dated Jul. 22, 2014, by the Japanese Patent Office as the International Searching Authority for International Application No. PCT/JP2014/059742.

* cited by examiner

AQUEOUS ALUMINUM BRAZING COMPOSITION

TECHNICAL FIELD

The present invention relates to aqueous aluminum brazing compositions and particularly to an aqueous aluminum brazing composition used to braze aluminum and/or aluminum alloy members to each other.

BACKGROUND ART

In heat exchangers for vehicles (such as evaporators and condensers) and heat exchangers for home use (such as water heaters and air conditioners), members produced by, for example, brazing (joining) aluminum or aluminum alloy members to each other have been used.

Specifically, for example, a heat exchanger for a vehicle is formed by joining tubes, fins, side plates, a tank, etc., made of aluminum or an aluminum alloy by brazing.

Generally, to braze such components, a brazing composition containing a flux, a binder resin, and, if necessary, a brazing material etc. is used. Specifically, for example, a flux composition for brazing of an aluminum material has been proposed, which is obtained by dispersing 1 to 60% by weight, based on the total dry weight of the flux composition, of a flux in an aqueous solution containing 1.0 to 20% by weight, on a dry weight basis, of a water-soluble organic resin such as a water-soluble acrylic resin or a water-soluble polyurethane resin and further containing at least one of a curing agent and a surfactant (see Patent Literature 1 below (Examples 1 and 2)).

Generally, such a flux composition for brazing of an aluminum material is applied to brazing portions of various components and is heated after these components are assembled. The binder resin is thereby thermally decomposed, and the components are brazed (joined).

If the binder resin is not thermally decomposed sufficiently, incomplete decomposition products (such as compounds having carbon-carbon bonds) are mixed into the decomposition gas. However, when the space between components to be brazed is large and is in an open state (an open space), the decomposition gas is released to the air.

CITATION LIST

Patent Literature

Patent Literature 1: Japanese Patent Application Laid-Open No. Hei. 6-285682

SUMMARY OF INVENTION

Technical Problem

Recently, heat exchangers for vehicles are enhanced in performance and reduced in weight, and their components are also increased in complexity and reduced in thickness. Therefore, the spaces between the components become small, and portions to be brazed are in a substantially closed state (in a substantially closed space) in some cases.

When brazing is performed in such a substantially closed space, the decomposition gas generated by thermal decomposition of the binder resin may stay inside the substantially closed space. Therefore, incomplete decomposition products contained in the decomposition gas may cause darkening of the surfaces of the brazed components, and this may result in poor appearance.

In recent brazing, it is required to improve brazability in both an open space environment and a substantially closed space environment.

In addition, since compositions used for brazing may be stored for a relatively long time, these compositions are required to have excellent storage stability.

Accordingly, an object of the present invention is to provide an aqueous aluminum brazing composition that allows good appearance to be maintained even after brazing and is excellent in brazability and storage stability.

Means for Solving Problem

The aqueous aluminum brazing composition of the present invention contains a binder resin, the binder resin being a water-soluble/dispersible polyurethane resin that exhibits a residual ratio of 60% by mass or less in a 400° C. heating environment and exhibits a residual ratio of 1.0% by mass or less in a 520° C. heating environment.

Preferably, the aqueous aluminum brazing composition of the present invention further contains a flux, wherein a ratio of the binder resin added is 0.03 parts by mass or more and 15 parts by mass or less with respect to 100 parts by mass of the aqueous aluminum brazing composition, and a ratio of the flux added is 10 parts by mass or more and 75 parts by mass or less with respect to 100 parts by mass of the aqueous aluminum brazing composition.

Preferably, in the aqueous aluminum brazing composition of the present invention, the water-soluble/dispersible polyurethane resin is obtained by reacting at least a polyisocyanate and a polyol with each other. Preferably, the polyisocyanate comprises an aliphatic polyisocyanate, and/or the polyol comprises an aliphatic polyol. Preferably, a total amount of the aliphatic polyisocyanate and the aliphatic polyol is 61 parts by mass or more with respect to 100 parts by mass of a total amount of the polyisocyanate and the polyol.

Preferably, in the aqueous aluminum brazing composition of the present invention, the aliphatic polyol comprises at least one selected from the group consisting of an aliphatic polyether polyol, an aliphatic polyester polyol, and an aliphatic polycarbonate polyol.

Preferably, in the aqueous aluminum brazing composition of the present invention, a total amount of the aliphatic polyether polyol, the aliphatic polyester polyol, and the aliphatic polycarbonate polyol is 20 parts by mass or more with respect to 100 parts by mass of the polyol.

Preferably, in the aqueous aluminum brazing composition of the present invention, the aliphatic polyol comprises no aliphatic polyether polyol and comprises an aliphatic polyester polyol and/or an aliphatic polycarbonate polyol.

Preferably, in the aqueous aluminum brazing composition of the present invention, the aliphatic polyol comprises no aliphatic polyether polyol and no aliphatic polyester polyol and comprises an aliphatic polycarbonate polyol.

Preferably, in the aqueous aluminum brazing composition of the present invention, the aliphatic polyisocyanate comprises an alicyclic polyisocyanate.

Preferably, in the aqueous aluminum brazing composition of the present invention, a content of the alicyclic polyisocyanate is 40 parts by mass or more with respect to 100 parts by mass of a total amount of the polyisocyanate.

Preferably, in the aqueous aluminum brazing composition of the present invention, the polyol further comprises a carboxy group-containing polyol.

Preferably, the aqueous aluminum brazing composition of the present invention is used for brazing of aluminum and/or an aluminum alloy in a substantially closed space.

Advantageous Effects of Invention

The aqueous aluminum brazing composition of the present invention contains the binder resin that exhibits a residual ratio of 60% by mass or less in a 400° C. heating environment and exhibits a residual ratio of 1.0% by mass or less in a 520° C. heating environment, so that the binder resin can be preferably decomposed by heating. Therefore, mixing of incomplete decomposition products into the decomposition gas during brazing can be suppressed. In this case, darkening of the surfaces of the brazed components is suppressed, so that the appearance of these components can be maintained favorably. In addition, the aqueous aluminum brazing composition is excellent in brazability and storage stability.

DESCRIPTION OF EMBODIMENTS

Figure 1A:
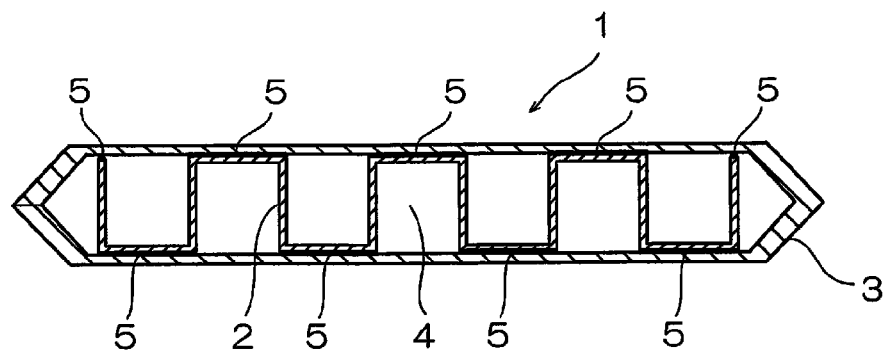
FIG. 1A is a schematic configuration diagram illustrating an embodiment of an inner fin tube for which the aqueous aluminum brazing composition of the present invention is used and is a schematic cross-sectional view of the inner fin tube.

The aqueous aluminum brazing composition of the present invention contains a binder resin, a flux, and a water-miscible solvent.

In the above aqueous aluminum brazing composition, the binder resin is used to allow the flux described later to adhere to any of aluminum and aluminum alloys (these may be hereinafter referred collectively as aluminum materials).

Specifically, a resin that exhibits a residual ratio of 60% by mass or less in a 400° C. heating environment and exhibits a residual ratio of 1.0% by mass or less in a 520° C. heating environment is selected as the binder resin.

In the above binder resin, the "residual ratio in a 400° C. heating environment" is the ratio (% by mass) of the binder resin remaining when, in differential thermobalance measurement, the binder resin is heated from 30° C. in a nitrogen atmosphere at a temperature rise rate of 20° C./minute and the temperature reaches 400° C. The "residual ratio in a 520° C. heating environment" is the ratio (% by mass) of the binder resin remaining when, in the differential thermobalance measurement, the binder resin is heated from 30° C. in a nitrogen atmosphere at a temperature rise rate of 20° C./minute and the temperature reaches 520° C. In each case, the residual ratio is the mass ratio with respect to the total mass of solids in the binder resin before heating.

The residual ratio in a 400° C. heating environment is 60% by mass or less, preferably 30% by mass or less, more preferably 10% by mass or less, and still more preferably 5% by mass or less.

The residual ratio in a 520° C. heating environment is 1.0% by mass or less, preferably 0.7% by mass or less, more preferably 0.5% by mass or less, still more preferably, 0.1% by mass or less, and particularly preferably equal to less than the limit of measurement (0% by mass).

When both the residual ratio of the binder resin in a 400° C. heating environment and its residual ratio in a 520° C. heating environment fall within the above ranges, the binder resin can be thermally decomposed by heating preferably. In the following description, the "residual ratio in a 400° C. heating environment" and the "residual ratio in a 520° C. heating environment" may be collectively referred to as "thermal decomposition properties."

Therefore, the production of incomplete decomposition products by thermal decomposition can be suppressed. In this case, darkening of the brazed portions can be suppressed, and their appearance can be maintained favorably. In addition, brazability and storage stability can be improved.

Examples of the binder resin include water-soluble/dispersible resins having thermal decomposition properties that meet the above conditions, and specific examples include water-soluble/dispersible polyurethane resins.

The water-soluble/dispersible resins mean that the resins are water soluble or have high water dispersibility. The water-soluble/dispersible resin applied to the above-described aqueous aluminum brazing composition may be water soluble or may be an emulsion.

The use of the water-soluble/dispersible resin as the binder resin in the aqueous aluminum brazing composition can reduce the amount of the organic solvent used and therefore can solve occupational safety and health problems such as ignition and an explosion during use.

Particularly, when the binder resin used is a water-soluble/dispersible polyurethane resin, the thermal decomposition properties can be controlled easily and reliably, so that the appearance can be maintained favorably in a simpler manner. In addition, the brazability and storage stability can be improved.

The water-soluble/dispersible polyurethane resin can be obtained by reacting at least a polyisocyanate and a polyol. More specifically, the water-soluble/dispersible polyurethane resin can be obtained by a prepolymer method in which, for example, an isocyanate group-terminated prepolymer obtained by reacting a polyisocyanate with a polyol is reacted with a chain extension agent, a one-shot method in which, for example, raw materials such as a polyisocyanate and a polyol are reacted at once, or a similar method. From the viewpoint of dispersibility and the ease of production, it is preferable to obtain the water-soluble/dispersible polyurethane resin by the prepolymer method.

Examples of the polyisocyanate include aliphatic polyisocyanates and aromatic polyisocyanates.

In the present invention, the aliphatic polyisocyanates are polyisocyanates having no aromatic ring in their molecule, and examples thereof include aliphatic diisocyanates such as 1,3-trimethylene diisocyanate, 1,4-tetramethylene diisocyanate, 1,5-pentamethylene diisocyanate, and 1,6-hexamethylene diisocyanate.

The aliphatic polyisocyanates include alicyclic polyisocyanates.

Examples of the alicyclic polyisocyanates include alicyclic diisocyanates such as cyclohexane diisocyanate, 3-isocyanatomethyl-3,5,5-trimethylcyclohexyl isocyanate (also known as isophorone diisocyanate), dicyclohexylmethane-4,4-diisocyanate (also known as methylene bis(cyclohexyl isocyanate)), norbornane diisocyanate, and bis(isocyanatomethyl)cyclohexane.

One type of these aliphatic polyisocyanates may be used alone, or a combination of two or more types may be used.

In the present invention, the aromatic polyisocyanates are polyisocyanates having at least one aromatic ring in their molecule, and examples thereof include aromatic diisocyanates such as tolylene diisocyanates (2,4- and 2,6-tolylene diisocyanates and mixtures thereof), phenylene diisocyanates (m- and p-phenylene diisocyanates and mixtures thereof), 1,5-naphthalene diisocyanate, diphenylmethane diisocyanates (4,4'-, 2,4'-, and 2,2'-diphenylmethane diisocyanates and mixtures thereof), polymethylene polyphenyl polyisocyanate (polymeric MDI), and 4,4'-toluidine diisocyanate.

The aromatic polyisocyanates include aromatic aliphatic polyisocyanates.

Examples of the aromatic aliphatic polyisocyanates include aromatic aliphatic diisocyanates such as xylylene diisocyanates (1,3- and 1,4-xylylene diisocyanates and mixtures thereof) and tetramethylxylylene diisocyanates (1,3- and 1,4-tetramethylxylylene diisocyanates and mixtures thereof).

One type of these aromatic polyisocyanates may be used alone, or a combination of two or more types may be used.

One type of the above polyisocyanates may be used alone, or a combination of two or more types may be used. Preferably, at least an aliphatic polyisocyanate is contained as the polyisocyanate. More preferably, an alicyclic polyisocyanate is contained. More preferred examples of the polyisocyanate include isophorone diisocyanate and dicyclohexylmethane-4,4-diisocyanate, and particularly preferred examples include isophorone diisocyanate.

When any of the above-described polyisocyanates is used, the thermal decomposition properties of the water-soluble/dispersible polyurethane resin can be controlled within the above-described ranges, so that the appearance can be maintained favorably. In addition, the brazability and storage stability can be improved.

When the polyisocyanates used include an alicyclic polyisocyanate, its content is, for example, 40 parts by mass or more with respect to 100 parts by mass of the total amount of the polyisocyanates, preferably 50 parts by mass or more, more preferably 55 parts by mass or more, still more preferably 70 parts by mass or more, and particularly preferably 100 parts by mass (i.e., only the alicyclic polyisocyanate is used as the polyisocyanate).

When the content of the alicyclic polyisocyanate falls within the above range, a water-soluble/dispersible polyurethane resin having particularly good thermal decomposition properties can be obtained, and the appearance can be maintained favorably. In addition, the brazability and storage stability can be improved.

Examples of the polyol include aliphatic polyols and aromatic polyols.

In the present invention, the aliphatic polyols are polyols having no aromatic ring in their molecule, and examples thereof include high-molecular weight aliphatic polyols and low-molecular weight aliphatic polyols.

The high-molecular weight aliphatic polyols are compounds having no aromatic ring in their molecule, having at least two hydroxyl groups, and having a number average molecular weight of 500 or more and 10,000 or less, and examples thereof include aliphatic polyether polyols, aliphatic polyester polyols, aliphatic polycarbonate polyols, and aliphatic polyurethane polyols.

The aliphatic polyether polyols are polyether polyols having no aromatic ring in their molecule and each can be obtained, for example, as an aliphatic polyalkylene oxide by ring-opening addition polymerization of an alkylene oxide using a low-molecular weight aliphatic polyol (described later) as an initiator.

Specific examples of the aliphatic polyether polyols include polyoxyethylene polyols (such as polyethylene glycol), polyoxypropylene polyols (such as polypropylene glycol), and polyoxyethylene-propylene polyols (such as random copolymers and block copolymers). Other examples include aliphatic polyether diols such as polytetramethylene ether glycol obtained by ring-opening polymerization of tetrahydrofuran.

The aliphatic polyester polyols are polyester polyols having no aromatic ring in their molecule and each can be obtained by, for example, a dehydration condensation reaction of a low-molecular weight aliphatic polyol (described later) with an aliphatic polycarboxylic acid or an ester-forming derivative thereof.

Examples of the aliphatic polycarboxylic acid include: aliphatic dicarboxylic acids (such as succinic acid, adipic acid, azelaic acid, sebacic acid, fumaric acid, and maleic acid); alicyclic dicarboxylic acids (such as dimer acids); tricarboxylic acids and higher polycarboxylic acids (such as trimer acids); and anhydrides, acid halides, and low-molecular weight alkyl esters thereof.

Specific examples of the aliphatic polyester polyols include aliphatic polyester diols such as polyethylene adipate diol, polybutylene adipate diol, polyhexamethylene adipate diol, polyneopentyl adipate diol, polyethylene propylene adipate diol, polyethylene butylene adipate diol, polybutylene hexamethylene adipate diol, polydiethylene adipate diol, poly(polytetramethylene ether) adipate diol, poly(3-methylpentylene adipate) diol, polyethylene azelate diol, polyethylene sebacate diol, polybutylene azelate diol, and polybutylene sebacate diol.

The aliphatic polycarbonate polyols are polycarbonate polyols having no aromatic ring in their molecule and each can be obtained by, for example, a dealcoholization reaction and condensation of a low-molecular weight aliphatic polyol (described later) and a low-molecular weight carbonate compound (such as a dialkyl carbonate including alkyl groups having 1 to 6 carbon atoms or an alkylene carbonate including an alkylene group having 2 to 6 carbon atoms).

Specific examples of the aliphatic polycarbonate polyols include aliphatic polycarbonate diols such as polyhexamethylene carbonate diol, polypentamethylene carbonate diol, poly(hexamethylene/pentamethylene) carbonate diol, polytetramethylene carbonate diol, and poly(tetramethylene/hexamethylene) carbonate diol.

The aliphatic polyurethane polyols are polyurethane polyols having no aromatic ring in their molecule and each can be obtained by, for example, reacting any of the above-described aliphatic polyisocyanates with any of the above-described aliphatic polyols such as the aliphatic polyether polyols, the aliphatic polyester polyols, and the aliphatic polycarbonate polyols such that the equivalent ratio (the hydroxyl groups/the isocyanate groups) of the hydroxyl groups in the aliphatic polyol to the isocyanate groups in the aliphatic polyisocyanate exceeds 1.

The low-molecular weight aliphatic polyol is a compound having no aromatic ring in its molecule, having at least two hydroxyl groups, and having a number average molecular weight of less than 500. Examples of the low-molecular weight aliphatic polyol include: C2-22 alkane diols such as ethylene glycol, propylene glycol, trimethylene glycol, 1,4-butylene glycol, 1,3-butylene glycol, 1,2-butylene glycol, 1,5-pentanediol, 3-methyl-1,5-pentanediol, 2,2-dimethyl-1,3-propanediol, neopentyl glycol, 1,6-hexanediol, 2,5- hexanediol, 2,2-diethyl-1,3-propanediol, 3,3-dimethylolheptane, 2-ethyl-2-butyl-1,3-propanediol, 1,12-dodecanediol, and 1,18-octadecanediol; aliphatic dihydric alcohols such as alkene diols including 2-butene-1,4-diol and 2,6-dimethyl-1-octene-3,8-diol; alicyclic dihydric alcohols such as 1,4-cyclohexanediol, 1,4-cyclohexanedimethanol, hydrogenated bisphenol A, and C2-4 alkylene oxide adducts thereof; aliphatic trihydric alcohols such as glycerin, 2-methyl-2-hydroxymethyl-1,3-propanediol, 2,4-dihydroxy-3-hydroxymethylpentane, 1,2,6-hexanetriol, trimethylolethane, trimethylolpropane, 2-methyl-2-hydroxymethyl-1,3-propanediol, 2,4-dihydroxy-3-(hydroxymethyl)pentane, and 2,2-bis(hydroxymethyl)-3-butanol; and tetrahydric and higher polyalcohols such as tetramethylolmethane, pentaerythritol, dipentaerythritol, D-sorbitol, xylitol, D-mannitol, and D-mannite.

One type of the above aliphatic polyols may be used alone, or a combination of two or more types may be used.

In the present invention, the aromatic polyols are polyols having at least one aromatic ring in their molecule, and examples thereof include high-molecular weight aromatic polyols and low-molecular weight aromatic polyols.

The high-molecular weight aromatic polyols are compounds having at least one aromatic ring in their molecule, having at least two hydroxyl groups, and having a number average molecular weight of 500 or more and 10,000 or less, and examples thereof include aromatic polyether polyols and aromatic polyester polyols.

The aromatic polyether polyols are polyether polyols having an aromatic ring in their molecule, and examples thereof include: polyols having a bisphenol skeleton such as ethylene oxide adducts of bisphenol A, propylene oxide adducts of bisphenol A, and ethylene oxide and propylene oxide adducts of bisphenol A; and aromatic polyether diols such as ethylene oxide adducts of resorcin, propylene oxide adducts of resorcin, and ethylene oxide and propylene oxide adducts of resorcin.

The aromatic polyester polyols are polyester polyols having an aromatic ring in their molecule and each can be obtained by, for example, a dehydration condensation reaction of a low-molecular weight aromatic polyol (described later) with an aromatic polycarboxylic acid or its ester-forming derivative.

When the aromatic polyester polyol is produced, any one of the low-molecular weight aromatic polyol and the aromatic polycarboxylic acid may be an aliphatic compound (a low-molecular weight aliphatic polyol or an aliphatic polycarboxylic acid), or a combination of an aromatic compound (the low-molecular weight aromatic polyol or the aromatic polycarboxylic acid) and an aliphatic compound (a low-molecular weight aliphatic polyol or an aliphatic polycarboxylic acid) may be used.

Examples of the aromatic polycarboxylic acid include: aromatic dicarboxylic acids (such as terephthalic acid, isophthalic acid, and phthalic acid); tricarboxylic and higher polycarboxylic acids (such as trimellitic acid and pyromellitic acid); and anhydrides, acid halides, and low-molecular weight alkyl esters thereof.

Specific examples of the aromatic polyester polyol include aromatic polyester diols such as polyethylene terephthalate diol, polybutylene terephthalate diol, polyethylene isophthalate diol, polybutylene isophthalate diol, poly(3-methylpentyleneterephthalate) diol, and polyneopentylene terephthalate diol.

The low-molecular weight aromatic polyol is a compound having at least one aromatic ring in its molecule, having at least two hydroxyl groups, and having a number average molecular weight of less than 500, and examples thereof include aromatic dihydric alcohols such as resorcin, xylylene glycol, bishydroxyethoxybenzene, bishydroxyethylene terephthalate, bisphenol A, bisphenol S, bisphenol F, and C2-4 alkylene oxide adducts of these bisphenols.

One type of the above aromatic polyols may be used alone, or a combination of two or more types may be used.

One type of the above polyols may be used alone, or a combination of two or more types may be used.

Preferably, at least an aliphatic polyol is contained as the polyol. More preferably, a combination of a high-molecular weight aliphatic polyol and a low-molecular weight aliphatic polyol is used.

When a combination of a high-molecular weight aliphatic polyol and a low-molecular weight aliphatic polyol is used, the content (total amount) of the high-molecular weight aliphatic polyol is, for example, 20 parts by mass or more with respect to 100 parts by mass of the total amount of the polyols, preferably 35 parts by mass or more, and more preferably 55 parts by mass or more and is, for example, 95 parts by mass or less, preferably 90 parts by mass or less, and more preferably 85 parts by mass or less. The content (total amount) of the low-molecular weight aliphatic polyol is, for example, 5 parts by mass or more with respect to 100 parts by mass of the total amount of the polyols, preferably 10 parts by mass or more, and more preferably 15 parts by mass or more and is, for example, 80 parts by mass or less, preferably 65 parts by mass or less, and more preferably 45 parts by mass or less.

Preferred examples of the aliphatic polyols include aliphatic polyether polyols, aliphatic polyester polyols, and aliphatic polycarbonate polyols. More preferred examples of the aliphatic polyols include bifunctional aliphatic polyols, i.e., aliphatic polyether diols, aliphatic polyester diols, and aliphatic polycarbonate diols.

When any of the above-described aliphatic polyols is used, the thermal decomposition properties of the water-soluble/dispersible polyurethane resin can be controlled within the above-described ranges, so that the appearance can be maintained favorably. In addition, the brazability and storage stability can be improved.

In such a case, the content (the total amount) of the above-described aliphatic polyether polyol, aliphatic polyester polyol, and aliphatic polycarbonate polyol is, for example, 20 parts by mass or more with respect to 100 parts by mass of the total amount of the polyols, preferably 35 parts by mass or more, and more preferably 55 parts by mass or more and is, for example, 100 parts by mass (i.e., only the aliphatic polyether polyol, aliphatic polyester polyol, and aliphatic polycarbonate polyol are used as the polyols) or less and preferably 85 parts by mass or less.

When the content of these polyols falls within the above range, a water-soluble/dispersible polyurethane resin particularly excellent in thermal decomposition properties can be obtained, and the appearance can be maintained favorably. In addition, the brazability and storage stability can be improved.

More preferably, no aliphatic polyether polyol is contained, and an aliphatic polyester polyol and/or an aliphatic polycarbonate polyol is contained as the aliphatic polyol. Still more preferably, no bifunctional aliphatic polyol, i.e., no aliphatic polyether polyol, is contained, and an aliphatic polyester diol and/or an aliphatic polycarbonate diol is contained as the aliphatic polyol.

In such a case, the content (the total amount) of the aliphatic polyester polyol and the aliphatic polycarbonate polyol is, for example, 50 parts by mass or more with respect to 100 parts by mass of the total amount of the polyols, preferably 70 parts by mass or more, and more preferably 80 parts by mass or more and is, for example, 100 parts by mass (i.e., only the aliphatic polyester polyol and the aliphatic polycarbonate polyol are used as the polyols) or less and preferably 85 parts by mass or less.

When no aliphatic polyether polyol (no aliphatic polyalkylene oxide) is contained and an aliphatic polyester polyol and/or an aliphatic polycarbonate polyol is contained as the aliphatic polyol and used at the above described ratio, the thermal decomposition properties of the water-soluble/dispersible polyurethane resin can be controlled within the above range, so that the appearance can be maintained favorably. In addition, the brazability and storage stability can be improved.

More preferably, no aliphatic polyether polyol and no aliphatic polyester polyol are contained, and an aliphatic polycarbonate polyol is contained as the aliphatic polyol. Particularly preferably, no bifunctional aliphatic polyols, i.e., no aliphatic polyether polyol and no aliphatic polyester polyol, are contained, and an aliphatic polycarbonate diol is contained as the aliphatic polyol.

In such a case, the content (the total amount) of the aliphatic polycarbonate polyol is, for example, 35 parts by mass or more with respect to 100 parts by mass of the total amount of the polyols, preferably 50 parts by mass or more, and more preferably 70 parts by mass or more and is, for example, 100 parts by mass (i.e., only the aliphatic polycarbonate polyol is used as the polyol) or less and preferably 85 parts by mass or less.

When no aliphatic polyether polyol (no aliphatic polyalkylene oxide) and no aliphatic polyester polyol are contained and an aliphatic polycarbonate polyol is contained as the aliphatic polyol and used at the above-described ratio, the thermal decomposition properties of the water-soluble/dispersible polyurethane resin can be controlled within the above ranges, so that the appearance can be maintained favorably. In addition, the brazability and storage stability can be improved.

Preferably, a hydrophilic group-containing polyol is further contained as a polyol.

The hydrophilic group-containing polyol is a polyol containing, as the hydrophilic group, an ionic group (an anionic group or a cationic group) such as a carboxy group or a sulfo group. Examples thereof include carboxy group-containing polyols and sulfo group-containing polyols, and preferred examples include carboxy group-containing polyols.

In the present invention, a compound that is a carboxy group-containing polyol having no aromatic ring in its molecule and has a number average molecular weight of less than 500 is classified as the low-molecular weight aliphatic polyol described above. A compound that is a carboxy group-containing polyol having at least one aromatic ring in its molecule and has a number average molecular weight of less than 500 is classified as the low-molecular weight aromatic polyol described above.

Examples of the carboxy group-containing polyol include dihydroxyl aliphatic carboxylic acids such as 2,2-dimethylolacetic acid, 2,2-dimethylollactic acid, 2,2-dimethylolpropionic acid (DMPA), 2,2-dimethylolbutanoic acid (DMBA), 2,2-dimethylolbutyric acid, and 2,2-dimethylolvaleric acid.

One type of these carboxy group-containing polyols may be used alone, or a combination of two or more types may be used. The carboxy group-containing polyol is preferably 2,2-dimethylolpropionic acid (DMPA).

The content of the carboxy-containing polyol is, for example, 2 parts by mass or more with respect to 100 parts by mass of the total amount of the polyols, preferably 5 parts by mass or more, and more preferably 7 parts by mass or more and is, for example, 25 parts by mass or less, preferably 20 parts by mass or less, and more preferably 15 parts by mass or less.

When the polyols include the carboxy group-containing polyol at the ratio described above, the water-soluble/dispersible polyurethane resin can be easily obtained, so that the efficiency of production can be improved.

An isocyanate group-terminated prepolymer can be obtained by reacting the above-described polyisocyanates with the above-described polyols (preferably, the polyol comprises a hydrophilic group-containing polyol).

Preferably, in this reaction, the polyisocyanate comprises an aliphatic polyisocyanate, and/or the polyol comprises an aliphatic polyol. Specifically, it is preferable that at least one of the polyisocyanate and the polyol comprise an aliphatic compound, and it is more preferable that each of the polyisocyanate and the polyol comprises an aliphatic compound.

In a combination of the polyisocyanate and the polyol, the total amount of the aliphatic polyisocyanate and the aliphatic polyol is adjusted to, for example, 61 parts by mass or more with respect to 100 parts by mass of the total amount of the polyisocyanate and the polyol, preferably 65 parts by mass or more, more preferably 75 parts by mass or more, and particularly preferably 100 parts by mass (i.e., only the aliphatic polyisocyanate and the aliphatic polyol are used).

When the total amount of the aliphatic polyisocyanate and the aliphatic polyol is within the above range, the use of the water-soluble/dispersible polyurethane resin obtained allows the appearance to be maintained favorably. In addition, the brazability and storage stability can be improved.

The ratio of the polyisocyanate added to the polyol added in this reaction is such that the equivalent ratio (the isocyanate groups/the hydroxyl groups) of the isocyanate groups in the polyisocyanate to the hydroxyl groups in the polyol exceeds 1 and is preferably 1.1 to 10.

No particular limitation is imposed on the reaction method, and any known polymerization method such as bulk polymerization or solution polymerization is used.

In the bulk polymerization, for example, the above-described components are mixed in a nitrogen atmosphere and allowed to react at a reaction temperature of 75 to 85° C. for about 1 to about 20 hours. In the solution polymerization, for example, the above-described components are added to an organic solvent in a nitrogen atmosphere and allowed to react at a reaction temperature of 20 to 80° C. for about 0.5 to about 20 hours.

No particular limitation is imposed on the organic solvent, so long as it is inert against isocyanate groups and is highly hydrophilic. Examples of the organic solvent include acetone, methyl ethyl ketone, ethyl acetate, tetrahydrofuran, and acetonitrile.

In the polymerization described above, a reaction catalyst such as an amine-, tin-, or lead-based reaction catalyst may be added as needed. In this method, unreacted polyisocyanates can be removed from the obtained isocyanate group-terminated prepolymer using a known method such as distillation or extraction.

When ionic groups (anionic groups or cationic groups) such as carboxy groups are contained, as hydrophilic groups, in the obtained isocyanate group-terminated prepolymer, it is preferably to add a neutralizer to form a salt of the ionic groups.

Examples of the neutralizer used when anionic groups are contained include commonly used bases such as: organic bases (e.g., tertiary amines (tri-C1-4 alkyl amines such as trimethylamine and triethylamine, alkanolamines such as dimethylethanolamine, methyldiethanolamine, triethanolamine, and triisopropanolamine, and heterocyclicamines such as morpholine)); and inorganic bases (e.g., ammonia, alkali metal hydroxides (such as lithium hydroxide, sodium hydroxide, and potassium hydroxide), alkaline-earth metal hydroxides (such as magnesium hydroxide and calcium hydroxide), and alkali metal carbonates (such as sodium carbonate and potassium carbonate)). One type of these bases may be used alone, or a combination of two or more types may be used.

The neutralizer is added at a ratio of 0.4 to 1.2 equivalents and preferably 0.6 to 1 equivalent per one equivalent of the anionic groups.

The thus-obtained isocyanate group-terminated prepolymer is, for example, a polyurethane prepolymer having at least two free isocyanate groups at ends of its molecule, and the average number of functional groups, i.e., isocyanate groups, in the prepolymer is, for example, 1.5 to 3.0 and preferably 1.9 to 2.5. The number average molecular weight of the isocyanate group-terminated prepolymer (the number average molecular weight obtained by GPC measurement using standard polystyrene for a calibration curve) is, for example, 1,000 to 30,000 and preferably 1,500 to 20,000.

Next, in this method, the isocyanate group-terminated prepolymer obtained as described above and a chain extension agent are dispersed in, for example, water (a dispersion medium) and allowed to react.

Examples of the chain extension agent include water (including water used as the dispersion medium).

If necessary, an optional component such as a polyamine, an amino alcohol, or urea may be used as a chain extension agent.

Examples of the polyamine include: diamines such as ethylenediamine, 1,3-propanediamine, 1,4-butanediamine, 1,6-hexamethylenediamine, 1,4-cyclohexanediamine, 3-aminomethyl-3,5,5-trimethylcyclohexylamine (isophoronediamine), 4,4'-dicyclohexylmethanediamine, 2,5(2,6)-bis(aminomethyl)bicyclo[2.2.1]heptane, 1,3-bis(aminomethyl)cyclohexane, hydrazine, N-(2-aminoethyl)ethanolamine, and N-(2-aminoethyl)isopropanolamine; triamines such as diethylenetriamine, triethylenetetramine, and tetraethylenepentamine; tetraamines; and pentaamines.

One type of these chain extension agents may be used alone, or a combination of two or more types may be used. Any of the polyamines is preferably used.

To allow the isocyanate group-terminated prepolymer to react with the chain extension agent in water, first, for example, water is added to the isocyanate group-terminated prepolymer to disperse the isocyanate group-terminated prepolymer in the water, and then, if necessary, an optional component (such as a polyamine) is added to extend the chain of the isocyanate group-terminated prepolymer through the chain extension agent.

To disperse the isocyanate group-terminated prepolymer in water, the water is added to the isocyanate group-terminated prepolymer under stirring at a ratio of 20 to 500 parts by mass of water to 100 parts by mass of the isocyanate group-terminated prepolymer.

When an optional component is used, the optional component is added dropwise to the water containing the isocyanate group-terminated prepolymer dispersed therein under stirring such that the equivalent ratio (the active hydrogen groups/the isocyanate groups) of the active hydrogen groups (amino groups) in the chain extension agent to the isocyanate groups in the isocyanate group-terminated prepolymer is, for example, 0.4 or less and preferably 0.35 or less.

Then, while stirring is continued, the reaction is completed at, for example, room temperature. In this manner, the water-soluble/dispersible polyurethane resin can be obtained as a water dispersion (as a water dispersion with a solid concentration of, for example, 10 to 60% by mass and preferably 15 to 50% by mass and more preferably as a water dispersion with a solid concentration of 20 to 45% by mass).

In contrast to the above case, the isocyanate group-terminated prepolymer may be added to water to disperse the isocyanate group-terminated prepolymer in the water, and then, if necessary, an optional component may be added to extend the chain of the isocyanate group-terminated prepolymer through the chain extension agent.

When the isocyanate group-terminated prepolymer obtained by solution polymerization is used, the organic solvent may be removed after completion of the reaction by, for example, heating the mixture at an appropriate temperature under reduced pressure.

The water-soluble/dispersible polyurethane resin can thereby be obtained.

Additives such as a plasticizer, an antifoaming agent, a leveling agent, a fungicide, an anticorrosive, a matting agent, a flame retardant, a thixotropic agent, a tackifier, a thickener, a lubricant, an antistatic agent, a surfactant, a reaction retarder, an antioxidant, an ultraviolet absorber, a hydrolysis inhibitor, a weathering stabilizer, a heat stabilizer, a dye, an inorganic pigment, an organic pigment, an extender, a curing agent, an anti-tack agent, and filler may be appropriately added to the water-soluble/dispersible polyurethane resin, so long as the effects of the present invention are not impaired. The ratios of various additives added may be selected according to the purpose and application of the additives.

No particular limitation is imposed on the flux in the aqueous aluminum brazing composition. Examples of the flux include non-reactive fluxes and reactive fluxes.

Examples of the non-reactive fluxes include potassium fluoroaluminate, a potassium fluoroaluminate-cesium complex, a potassium fluoroaluminate-lithium complex, potassium fluoride, aluminum fluoride, lithium fluoride, sodium fluoride, and non-reactive cesium-based fluxes such as cesium fluoroaluminate.

Examples of the reactive fluxes include zinc-substituted fluxes (such as potassium fluorozincate and cesium fluorozincate) and fluxes of fluorides thereof.

If necessary, a known additive may be added to the flux at an appropriate ratio.

Such a flux is available as a commercial product, and specific examples of the commercial product include Nocolok Flux (potassium fluoroaluminate), Nocolok Cs Flux (a cesium-based flux), Nocolok Sil Flux (a mixture of a fluoride-based flux powder and a Si powder), which are manufactured by Solvay.

One type of these fluxes may be used alone, or a combination of two or more types may be used.

Examples of the water-miscible solvent in the above aqueous aluminum brazing composition include: water; alcohol solvents such as methanol, ethanol, propanol, isopropanol, butanol, isobutanol, s-butanol, t-butanol, 1,3-butanediol, 3-methyl-1,3-butanediol, and 3-methoxy-3-methyl-1-butanol; and ether solvents such as ethylene glycol methyl ether, ethylene glycol ethyl ether, ethylene glycol butyl ether, diethylene glycol methyl ether, diethylene glycol ethyl ether, diethylene glycol butyl ether, propylene glycol monomethyl ether, propylene glycol monoethyl ether, propylene glycol monobutyl ether, dipropylene glycol monomethyl ether, dipropylene glycol monoethyl ether, and dipropylene glycol monobutyl ether.

One type of these water-miscible solvents may be used alone, or a combination of two or more types may be used.

The water-miscible solvent is preferably water.

The aqueous aluminum brazing composition can be obtained by mixing the above-described components using a known method.

In the aqueous aluminum brazing composition, the ratio of the binder resin added is, for example, 0.03 parts by mass or more with respect to 100 parts by mass of the aqueous aluminum brazing composition, preferably 0.5 parts by mass or more, more preferably 0.6 parts by mass or more, still more preferably 1.2 parts by mass or more, and particularly preferably 2.5 parts by mass or more and is, for example, 15 parts by mass or less, preferably 14 parts by mass or less, and more preferably 9 parts by mass or less.

The ratio of the flux added is, for example, 10 parts by mass or more with respect to 100 parts by mass of the aqueous aluminum brazing composition, preferably 25 parts by mass or more, and more preferably 28 parts by mass or more and is, for example, 75 parts by mass or less, preferably 70 parts by mass or less, and more preferably 40 parts by mass or less.

The ratio of the water-miscible solvent added is, for example, the remainder after removal of the binder resin and the flux from the aqueous aluminum brazing composition (however, the remainder may appropriately contain a brazing material as described later).

When the aqueous aluminum brazing composition is used in a substantially closed space as described later, the ratio of the binder resin added may be, for example, 1.2 parts by mass or less, 0.6 parts by mass or less, or 0.5 parts by mass or less, may exceed, for example, 0 parts by mass, and may be 0.01 parts by mass or more or 0.03 parts by mass or more.

If necessary, the aqueous aluminum brazing composition may further contain a brazing material.

No particular limitation is imposed on the brazing material. Examples of the brazing material include a metallic silicon powder, silicon-aluminum alloys, and alloys prepared by adding additive elements such as magnesium, copper, and germanium to the silicon powder and the silicon-aluminum alloys.

One type of these brazing materials may be used alone, or a combination of two or more types may be used.

No particular limitation is imposed on the ratio of the brazing material added, and the ratio is appropriately selected according to its object and application.

The thus-obtained aqueous aluminum brazing composition is applied to, for example, aluminum members (aluminum and/or aluminum alloy members) and heated to thereby braze these aluminum members to each other.

Examples of a brazing atmosphere include inert gas atmospheres such as a helium atmosphere, an argon atmosphere, and a nitrogen atmosphere, and the brazing atmosphere is preferably a nitrogen atmosphere.

The oxygen concentration in the brazing atmosphere is, for example, 200 ppm or less, preferably 150 ppm or less, and more preferably 100 ppm or less.

The temperature of brazing is generally, for example, 580° C. or higher and preferably 590° C. or higher. The temperature of brazing is generally, for example, 640° C. or lower and preferably 630° C. or lower.

As described above, the aqueous aluminum brazing composition contains the binder resin that exhibits a residual ratio of 60% by mass or less (preferably 30% by mass or less, more preferably 10% by mass or less, and still more preferably 5% by mass or less) in a 400° C. heating environment and exhibits a residual ratio of 1.0% by mass or less (preferably 0.7% by mass or less, more preferably 0.5% by mass or less, still more preferably 0.1% by mass or less, and particularly preferably equal to or less than the limit of measurement (0% by mass)) in a 520° C. heating environment, so that the binder resin can be thermally decomposed by heating preferably.

Therefore, mixing of incomplete decomposition products into the decomposition gas during brazing can be suppressed. Even when the aqueous aluminum brazing composition is used for, for example, brazing in a substantially closed space, darkening of the surfaces of brazed components can be suppressed, and their appearance can be maintained favorably.

In addition, in the aqueous aluminum brazing composition of the present invention, the binder resin has high thermal decomposition properties, and therefore the aqueous aluminum brazing composition is excellent in brazability and can be preferably used for brazing of aluminum members not only in a substantially closed space but also in an open space.

Specifically, such an aqueous aluminum brazing composition is used for brazing of aluminum members and is preferably used for brazing of an inner fin tube in a heat exchanger.

For example, in heat exchangers for vehicles, their components are becoming increasingly smaller and more complex, from the viewpoint of improving the efficiency of heat exchange. For example, an inner fin tube containing a reduced amount of aluminum as compared to an extruded tube is used as a tube for a condenser.

The inner fin tube will next be described in detail.

As shown in FIG. 1, the inner fin tube 1 includes an inner fin member 2 and a tube member 3.

The inner fin member 2 is formed from a flat plate-shaped aluminum material and is shaped into a wavy bent shape including continuous substantially U-shaped (zigzag) portions as shown in FIG. 1A.

Figure 1B:
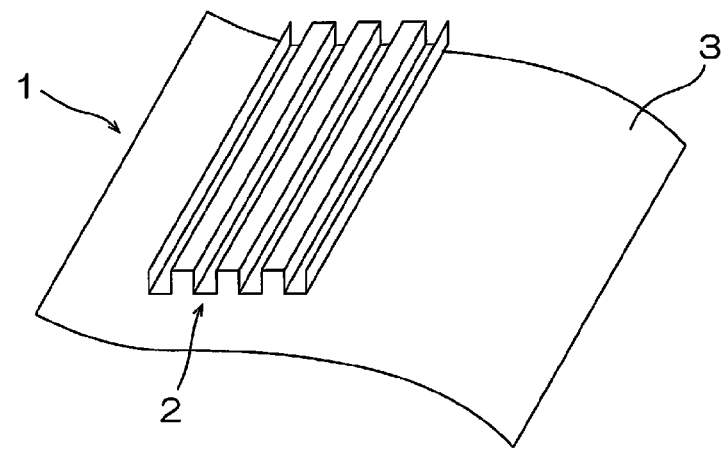
FIG. 1B is a schematic configuration diagram illustrating the embodiment of the inner fin tube for which the aqueous aluminum brazing composition of the present invention is used and is an exploded perspective view of the inner fin tube.

As shown in FIG. 1B, the tube member 3 is formed of a flexible aluminum material cladded with a brazing material and shaped into a sheet-like shape.

Instead of the members shown in FIG. 1B, an aluminum material cladded with a brazing material may be used for the inner fin member 2, and an aluminum material not cladded with a brazing material may be used for the tube member 3.

As shown in FIG. 1A, the inner fin tube 1 includes passages 4 having a rectangular cross section as spaces divided by the inner fin member 2. The passages 4 are spaces for circulation of a coolant and are divided as fine spaces with a side width of about 1 mm.

As shown in FIG. 1B, the inner fin tube 1 is produced by winding the tube member 3 around the inner fin member 2 and then brazing them at their contact portions 5.

When the above-described aqueous aluminum brazing composition is used for the production of this inner fin tube, good brazability can be ensured, and darkening etc. of the brazed portions can be suppressed, so that the appearance can be maintained favorably.

Specifically, since the components of the inner fin tube (such as the inner fin member 2 and the tube member 3 in FIG. 1) are increased in complexity and reduced in thickness, the spaces between the components (such as the passages 4) are small and are in a substantially closed state (substantially closed spaces) after the components are assembled.

During brazing in such substantially closed spaces, the decomposition gas generated by thermal decomposition of the binder resin may stay in the substantially closed spaces between the components. Therefore, if the decomposition gas contains incomplete decomposition products etc., the incomplete decomposition products may cause darkening of the surfaces of the brazed components, and this may result in poor appearance.

However, the above-described aqueous aluminum brazing composition contains the binder resin that exhibits a residual ratio of 60% by mass or less in a 400° C. heating environment and exhibits a residual ratio of 1.0% by mass or less in a 520° C. heating environment, so that the binder resin can be thermally decomposed by heating preferably. Therefore, the production of incomplete decomposition products can be suppressed, and darkening of the surfaces of the brazed members can be suppressed, so that their appearance can be maintained favorably. In addition, the aqueous aluminum brazing composition is excellent in brazability and storage stability.

Therefore, the use of the above-described aqueous aluminum brazing composition can suppress darkening of the surfaces of the brazed members, and their appearance can be maintained favorably. In addition, good brazability is obtained, and aluminum materials can be preferably brazed.

EXAMPLES

Next, the present invention will be described on the basis of Examples and Comparative Examples. However, the present invention is not limited to the Examples below. "Parts" and "%" are based on mass, unless otherwise specified. Numerical values in the Examples described below may be replaced with numerical values (i.e., the upper limits and lower limits) described in the embodiments.

Production Example 1

A four-necked flask equipped with a stirrer, a reflux condenser tube, a thermometer, and a nitrogen blowing tube was charged with 139.5 parts of a polyalkylene carbonate diol (an aliphatic polycarbonate polyol obtained from 1,5-pentanediol and 1,6-hexanediol, number average molecular weight: about 1,000, hydroxyl value: about 110 mg KOH/g), 13.6 parts of dimethylolpropionic acid, 9.5 parts of 1,6-hexanediol, 8.3 parts of neopentyl glycol, and 93.7 parts of methyl ethyl ketone, and the mixture was heated to 55° C. and stirred. After the compounds were mixed uniformly, 106.4 parts of isophorone diisocyanate was added, and the resultant mixture was heated to 70° C. and mixed. Then the mixture was cooled to 60° C., and 10.2 parts of triethylamine was added. The resultant mixture was further cooled to 30° C., and 124.5 parts of methyl ethyl ketone and 3.7 parts of triethylamine were added to 381 parts of the cooled solution, and the resultant mixture was dispersed in 643.7 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin A containing 29% of non-volatile components.

Production Example 2

A four-necked flask equipped with a stirrer, a reflux condenser tube, a thermometer, and a nitrogen blowing tube was charged with 149.7 parts of a polyalkylene carbonate diol (an aliphatic polycarbonate polyol obtained from 1,5-pentanediol and 1,6-hexanediol, number average molecular weight: about 1,000, hydroxyl value: about 110 mg KOH/g), 14.5 parts of dimethylolpropionic acid, 10.2 parts of 1,6-hexanediol, 8.9 parts of neopentyl glycol, and 100.4 parts of methyl ethyl ketone, and the mixture was heated to 55° C. and stirred. After the compounds were mixed uniformly, 86.1 parts of hexamethylene diisocyanate was added, and the resultant mixture was heated to 70° C. and mixed. Then the mixture was cooled to 60° C., and 11.0 parts of triethylamine was added. The resultant mixture was further cooled to 30° C., and 124.5 parts of methyl ethyl ketone and 3.7 parts of triethylamine were added to 381 parts of the cooled solution, and the resultant mixture was dispersed in 643.7 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin B containing 28% of non-volatile components.

Production Example 3

A four-necked flask equipped with a stirrer, a reflux condenser tube, a thermometer, and a nitrogen blowing tube was charged with 132.8 parts of a polyalkylene carbonate diol (an aliphatic polycarbonate polyol obtained from 1,5-pentanediol and 1,6-hexanediol, number average molecular weight: about 1,000, hydroxyl value: about 110 mg KOH/g), 12.9 parts of dimethylolpropionic acid, 9.1 parts of 1,6-hexanediol, 7.9 parts of neopentyl glycol, and 89.2 parts of methyl ethyl ketone, and the mixture was heated to 55° C. and stirred. After the compounds were mixed uniformly, 119.4 parts of dicyclohexylmethane-4,4-diisocyanate was added, and the resultant mixture was heated to 70° C. and mixed. Then the mixture was cooled to 60° C., and 9.7 parts of triethylamine was added. The resultant mixture was further cooled to 30° C., and 124.5 parts of methyl ethyl ketone and 3.7 parts of triethylamine were added to 381 parts of the cooled solution, and the resultant mixture was dispersed in 643.7 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin C containing 30% of non-volatile components.

Production Example 4

A four-necked flask equipped with a stirrer, a reflux condenser tube, a thermometer, and a nitrogen blowing tube was charged with 90.0 parts of a polyester diol (an aliphatic polyester diol comprising ethylene glycol component and adipic acid component, weight average molecular weight: 1,000, hydroxyl value: 110 mg KOH/g), 12.0 parts of dimethylolpropionic acid, 9.5 parts of 1,6-hexanediol, 8.3 parts of neopentyl glycol, and 93.3 parts of methyl ethyl ketone, and the mixture was heated to 55° C. and stirred. After the compounds were mixed uniformly, 91.9 parts of isophorone diisocyanate was added, and the resultant mixture was heated to 70° C. and mixed. Then the mixture was cooled to 60° C., and 9.0 parts of triethylamine was added. The resultant mixture was further cooled to 30° C., and 4.5 parts of triethylamine was added to 314 parts of the cooled solution, and the resultant mixture was dispersed in 463.0 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin D containing 30% of non-volatile components.

Production Example 5

A four-necked flask equipped with a stirrer, a reflux condenser tube, a thermometer, and a nitrogen blowing tube was charged with 90.0 parts of a polyether polyol (polypropylene glycol-propylene oxide (an aliphatic polyether polyol), average molecular weight: 1,000, hydroxyl value: 110 mg KOH/g), 12.0 parts of dimethylolpropionic acid, 9.5 parts of 1,6-hexanediol, 8.3 parts of neopentyl glycol, and 93.3 parts of methyl ethyl ketone, and the mixture was heated to 55° C. and stirred. After the compounds were mixed uniformly, 91.9 parts of isophorone diisocyanate was added, and the resultant mixture was heated to 70° C. and mixed. Then the mixture was cooled to 60° C., and 9.0 parts of triethylamine was added. The resultant mixture was further cooled to 30° C., and 4.5 parts of triethylamine was added to 314 parts of the cooled solution, and the resultant mixture was dispersed in 463.0 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin E containing 30% of non-volatile components.

Production Example 6

A four-necked flask equipped with a stirrer, a reflux condenser tube, a thermometer, and a nitrogen blowing tube was charged with 90.0 parts of a polyether polyol (polypropylene glycol-propylene oxide (an aliphatic polyether polyol), average molecular weight: 1,000, hydroxyl value: 110 mg KOH/g), 10.5 parts of dimethylolpropionic acid, 9.5 parts of 1,6-hexanediol, 8.3 parts of neopentyl glycol, and 93.3 parts of methyl ethyl ketone, and the mixture was heated to 55° C. and stirred. After the compounds were mixed uniformly, 67.3 parts of hexamethylene diisocyanate was added, and the resultant mixture was heated to 70° C. and mixed. Then the mixture was cooled to 50° C., and 9.0 parts of triethylamine was added. The resultant mixture was further cooled to 30° C., and 4.5 parts of triethylamine was added to 288 parts of the cooled solution, and the resultant mixture was dispersed in 463 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin F containing 28% of non-volatile components.

Production Example 7

A four-necked flask equipped with a stirrer, a reflux condenser tube, a thermometer, and a nitrogen blowing tube was charged with 50.5 parts of a polyether polyol (an aromatic polyether polyol comprising bisphenol A component and propylene oxide component, number average molecular weight: 1,000, hydroxyl value: about 110 mg KOH/g), 8.5 parts of dimethylolpropionic acid, 11.5 parts of 1,6-hexanediol, 10.5 parts of neopentyl glycol, and 93.3 parts of methyl ethyl ketone, and the mixture was heated to 55° C. and stirred. After the compounds were mixed uniformly, 64.0 parts of hexamethylene diisocyanate was added, and the resultant mixture was heated to 70° C. and mixed. Then the mixture was cooled to 50° C., and 9.0 parts of triethylamine was added. The resultant mixture was further cooled to 30° C., and 4.5 parts of triethylamine was added to 247 parts of the cooled solution, and the resultant mixture was dispersed in 463 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin P containing 23% of non-volatile components.

Production Example 8

A four-necked flask equipped with a stirrer, a reflux condenser tube, a thermometer, and a nitrogen blowing tube was charged with 24.3 parts of a polyether polyol (an aromatic polyether polyol comprising bisphenol A component and propylene oxide component, number average molecular weight: 1,000, hydroxyl value: about 110 mg KOH/g), 7.0 parts of dimethylolpropionic acid, 13.5 parts of 1,6-hexanediol, 13.0 parts of neopentyl glycol, and 93.3 parts of methyl ethyl ketone, and the mixture was heated to 55° C. and stirred. After the compounds were mixed uniformly, 64.7 parts of hexamethylene diisocyanate was added, and the resultant mixture was heated to 70° C. and mixed. Then the mixture was cooled to 50° C., and 9.0 parts of triethylamine was added. The resultant mixture was further cooled to 30° C., and 4.5 parts of triethylamine was added to 225 parts of the cooled solution, and the resultant mixture was dispersed in 463 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin Q containing 21% of non-volatile components.

Production Example 9

A four-necked flask equipped with a stirrer, a reflux condenser tube, a thermometer, and a nitrogen blowing tube was charged with 45.0 parts of a polyether polyol (polypropylene glycol-propylene oxide (an aliphatic polyether polyol), average molecular weight: 1,000, hydroxyl value: 110 mg KOH/g), 45.0 parts of a polyether polyol (an aromatic polyether polyol comprising bisphenol A and propylene oxide, number average molecular weight: 1,000, hydroxyl value: about 110 mg KOH/g), 12.0 parts of dimethylolpropionic acid, 9.5 parts of 1,6-hexanediol, 8.3 parts of neopentyl glycol, and 93.3 parts of methyl ethyl ketone, and the mixture was heated to 55° C. and stirred. After the compounds were mixed uniformly, 91.9 parts of isophorone diisocyanate was added, and the resultant mixture was heated to 70° C. and mixed. Then the mixture was cooled to 60° C., and 9.0 parts of triethylamine was added. The resultant mixture was further cooled to 30° C., and 4.5 parts of triethylamine was added to 314 parts of the cooled solution, and the resultant mixture was dispersed in 464.0 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin T containing 31% of non-volatile components.

Production Example 10

A four-necked flask equipped with a stirrer, a reflux condenser tube, a thermometer, and a nitrogen blowing tube was charged with 144.2 parts of a polyalkylene carbonate diol (an aliphatic polycarbonate polyol obtained from 1,5-pentanediol and 1,6-hexanediol, number average molecular weight: about 1,000, hydroxyl value: about 110 mg KOH/g), 14.0 parts of dimethylolpropionic acid, 9.9 parts of 1,6-hexanediol, 8.6 parts of neopentyl glycol, and 96.8 parts of methyl ethyl ketone, and the mixture was heated to 55° C. and stirred. After the compounds were mixed uniformly, 55.0 parts of isophorone diisocyanate and 41.5 parts of hexamethylene diisocyanate were added, and the resultant mixture was heated to 70° C. and mixed. Then the mixture was cooled to 60° C., and 10.6 parts of triethylamine was added. The resultant mixture was further cooled to 30° C., and 124.5 parts of methyl ethyl ketone and 3.7 parts of triethylamine were added to 381 parts of the cooled solution, and the resultant mixture was dispersed in 683.7 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin R containing 31% of non-volatile components.

Production Example 11

A four-necked flask equipped with a stirrer, a reflux condenser tube, a thermometer, and a nitrogen blowing tube was charged with 47.8 parts of a polyalkylene carbonate diol (an aliphatic polycarbonate polyol obtained from 1,5-pentanediol and 1,6-hexanediol, number average molecular weight: about 1,000, hydroxyl value: about 110 mg KOH/g), 48.3 parts of a polyester diol (an aliphatic polyester diol comprising ethylene glycol and adipic acid, weight average molecular weight: 1,000, hydroxyl value: 110 mg KOH/g), 12.7 parts of dimethylolpropionic acid, 9.7 parts of 1,6-hexanediol, 7.3 parts of neopentyl glycol, and 81.9 parts of methyl ethyl ketone, and the mixture was heated to 55° C. and stirred. After the compounds were mixed uniformly, 92.6 parts of isophorone diisocyanate was added, and the resultant mixture was heated to 70° C. and mixed. Then the mixture was cooled to 60° C., and 9.7 parts of triethylamine was added. The resultant mixture was further cooled to 30° C., and 54.4 parts of methyl ethyl ketone and 2.0 parts of triethylamine were added to 310 parts of the cooled solution, and the resultant mixture was dispersed in 494 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin S containing 30% of non-volatile components.

Production Example 12

A four-necked flask equipped with a stirrer, a reflux condenser tube, a thermometer, and a nitrogen blowing tube was charged with 63.3 parts of a polyether polyol (polypropylene glycol-propylene oxide (an aliphatic polyether polyol), average molecular weight: 1,000, hydroxyl value: 110 mg KOH/g), 9.9 parts of dimethylolpropionic acid, 20.1 parts of 1,6-hexanediol, 19.5 parts of neopentyl glycol, and 100.1 parts of methyl ethyl ketone, and the mixture was heated to 50° C. and stirred. After the compounds were mixed uniformly, 34.3 parts of polymeric MDI (NCO content: 30.5 to 32.0%) and 20.2 parts of hexamethylene diisocyanate were added, and the resultant mixture was heated to 55° C. and mixed. Then the mixture was cooled to 50° C., and 9.7 parts of triethylamine was added. The resultant mixture was further cooled to 30° C., and 4.3 parts of triethylamine was added to 277 parts of the cooled solution, and the resultant mixture was dispersed in 447 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin V containing 27% of non-volatile components.

Production Example 13

A four-necked flask equipped with a stirrer, a reflux condenser tube, a thermometer, and a nitrogen blowing tube was charged with 42.2 parts of a polyether polyol (polypropylene glycol-propylene oxide (an aliphatic polyether polyol), average molecular weight: 1,000, hydroxyl value: 110 mg KOH/g), 42.2 parts of a polyether polyol (a polyether polyol comprising bisphenol A and propylene oxide, number average molecular weight: 1,000, hydroxyl value: about 110 mg KOH/g), 11.3 parts of dimethylolpropionic acid, 8.9 parts of 1,6-hexanediol, 7.8 parts of neopentyl glycol, and 87.6 parts of methyl ethyl ketone, and the mixture was heated to 55° C. and stirred. After the compounds were mixed uniformly, 65.3 parts of hexamethylene diisocyanate was added, and the resultant mixture was heated to 70° C. and mixed. Then the mixture was cooled to 60° C., and 8.4 parts of triethylamine was added. The resultant mixture was further cooled to 30° C., and 4.2 parts of triethylamine was added to 274 parts of the cooled solution, and the resultant mixture was dispersed in 509 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin U containing 26% of non-volatile components.

Production Comparative Example 1

A four-necked flask equipped with a stirrer, a reflux condenser tube, a thermometer, and a nitrogen blowing tube was charged with 58.8 parts of a polyalkylene carbonate diol (an aliphatic polycarbonate polyol obtained from 1,5-pentanediol and 1,6-hexanediol, number average molecular weight: about 1,000, hydroxyl value: about 110 mg KOH/g), 13.2 parts of dimethylolpropionic acid, 33.8 parts of 1,6-hexanediol, 33.8 parts of neopentyl glycol, and 137.2 parts of methyl ethyl ketone, and the mixture was heated to 55° C. and stirred. After the compounds were mixed uniformly, 94.1 parts of polymeric MDI (NCO content: 30.5 to 32.0%) was added, and the resultant mixture was heated to 60° C. and mixed. Then the mixture was cooled to 50° C., and 9.6 parts of triethylamine was added. The resultant mixture was further cooled to 30° C., and 124.5 parts of methyl ethyl ketone and 3.7 parts of triethylamine were added to 381 parts of the cooled solution, and the resultant mixture was dispersed in 684 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin G containing 24% of non-volatile components.

Production Comparative Example 2

A four-necked flask equipped with a stirrer, a reflux condenser tube, a thermometer, and a nitrogen blowing tube was charged with 43.1 parts of a polyalkylene carbonate diol (an aliphatic polycarbonate polyol obtained from 1,5-pentanediol and 1,6-hexanediol, number average molecular weight: about 1,000, hydroxyl value: about 110 mg KOH/g), 10.8 parts of dimethylolpropionic acid, 21.5 parts of 1,6-hexanediol, 21.5 parts of neopentyl glycol, and 100.4 parts of methyl ethyl ketone, and the mixture was heated to 55° C. and stirred. After the compounds were mixed uniformly, 107.7 parts of toluene diisocyanate was added, and the resultant mixture was heated to 60° C. and mixed. Then the mixture was cooled to 50° C., and 10.9 parts of triethylamine was added. The resultant mixture was further cooled to 30° C., and 103.2 parts of methyl ethyl ketone and 3.1 parts of triethylamine were added to 316 parts of the cooled solution, and the resultant mixture was dispersed in 567 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin H containing 25% of non-volatile components.

Production Comparative Example 3

A four-necked flask equipped with a stirrer, a reflux condenser tube, a thermometer, and a nitrogen blowing tube was charged with 90.0 parts of a polyether polyol (an aromatic polyether polyol comprising bisphenol A component and propylene oxide component, number average molecular weight: 1,000, hydroxyl value: about 110 mg KOH/g), 12.0 parts of dimethylolpropionic acid, 9.5 parts of 1,6-hexanediol, 8.3 parts of neopentyl glycol, and 93.3 parts of methyl ethyl ketone, and the mixture was heated to 55° C. and stirred. After the compounds were mixed uniformly, 91.9 parts of isophorone diisocyanate was added, and the resultant mixture was heated to 70° C. and mixed. Then the mixture was cooled to 50° C., and 9.0 parts of triethylamine was added. The resultant mixture was further cooled to 30° C., and 4.5 parts of triethylamine was added to 314 parts of the cooled solution, and the resultant mixture was dispersed in 463 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin I containing 31% of non-volatile components.

Production Comparative Example 4

A four-necked flask equipped with a stirrer, a reflux condenser tube, a thermometer, and a nitrogen blowing tube was charged with 90.0 parts of a polyester diol (an aromatic polyester diol comprising adipic acid component, terephthalic acid component, and 3-methyl-1,5-pentanediol component, number average molecular weight: 2,000, hydroxyl value: about 56.1 mg KOH/g), 12.0 parts of dimethylolpropionic acid, 9.5 parts of 1,6-hexanediol, 8.3 parts of neopentyl glycol, and 93.3 parts of methyl ethyl ketone, and the mixture was heated to 55° C. and stirred. After the compounds were mixed uniformly, 80.0 parts of isophorone diisocyanate was added, and the resultant mixture was heated to 70° C. and mixed. Then the mixture was cooled to 50° C., and 9.0 parts of triethylamine was added. The resultant mixture was further cooled to 30° C., and 4.5 parts of triethylamine was added to 302 parts of the cooled solution, and the resultant mixture was dispersed in 463 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin J containing 30% of non-volatile components.

Production Comparative Example 5

A four-necked flask equipped with a stirrer, a reflux condenser tube, a thermometer, and a nitrogen blowing tube was charged with 35.0 parts of a polyester diol (an aliphatic polyester diol comprising ethylene glycol component and adipic acid component, weight average molecular weight:

1,000, hydroxyl value: 110 mg KOH/g), 9.0 parts of dimethylolpropionic acid, 24.0 parts of 1,6-hexanediol, 24.0 parts of neopentyl glycol, and 93.3 parts of methyl ethyl ketone, and the mixture was heated to 55° C. and stirred. After the compounds were mixed uniformly, 60.3 parts of polymeric MDI (NCO content: 30.5 to 32.0%) was added, and the resultant mixture was heated to 60° C. and mixed. Then the mixture was cooled to 50° C., and 9.0 parts of triethylamine was added. The resultant mixture was further cooled to 30° C., and 4.5 parts of triethylamine was added to 255 parts of the cooled solution, and the resultant mixture was dispersed in 463 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin K containing 24% of non-volatile components.

Production Comparative Example 6

A four-necked flask equipped with a stirrer, a reflux condenser tube, a thermometer, and a nitrogen blowing tube was charged with 35.0 parts of a polyether polyol (polypropylene glycol-propylene oxide (an aliphatic polyether polyol), average molecular weight: 1,000, hydroxyl value: 110 mg KOH/g), 9.0 parts of dimethylolpropionic acid, 24.0 parts of 1,6-hexanediol, 24.0 parts of neopentyl glycol, and 93.3 parts of methyl ethyl ketone, and the mixture was heated to 50° C. and stirred. After the compounds were mixed uniformly, 60.3 parts of polymeric MDI (NCO content: 30.5 to 32.0%) was added, and the resultant mixture was heated to 55° C. and mixed. Then the mixture was cooled to 50° C., and 9.0 parts of triethylamine was added. The resultant mixture was further cooled to 30° C., and 4.5 parts of triethylamine was added to 255 parts of the cooled solution, and the resultant mixture was dispersed in 463 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin L containing 24% of non-volatile components.

Production Comparative Example 7

A four-necked flask equipped with a stirrer, a reflux condenser tube, a thermometer, and a nitrogen blowing tube was charged with 92.7 parts of a polyether polyol (an aromatic polyether polyol comprising bisphenol A component and propylene oxide component, number average molecular weight: 1,000, hydroxyl value: about 110 mg KOH/g), 9.0 parts of dimethylolpropionic acid, 11.5 parts of 1,6-hexanediol, 9.3 parts of neopentyl glycol, and 93.3 parts of methyl ethyl ketone, and the mixture was heated to 50° C. and stirred. After the compounds were mixed uniformly, 46.1 parts of polymeric MDI (NCO content: 30.5 to 32.0%) was added, and the resultant mixture was heated to 55° C. and mixed. Then the mixture was cooled to 50° C., and 9.0 parts of triethylamine was added. The resultant mixture was further cooled to 30° C., and 4.5 parts of triethylamine was added to 268 parts of the cooled solution, and the resultant mixture was dispersed in 463 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin M containing 26% of non-volatile components.

Production Comparative Example 8

A four-necked flask equipped with a stirrer, a reflux condenser tube, a thermometer, and a nitrogen blowing tube was charged with 90.0 parts of a polyester diol (an aromatic polyester diol comprising adipic acid component, terephthalic acid component, and 3-methyl-1,5-pentanediol component, number average molecular weight: 2,000, hydroxyl value: about 56.1 mg KOH/g), 8.0 parts of dimethylolpropionic acid, 11.5 parts of 1,6-hexanediol, 9.3 parts of neopentyl glycol, and 93.3 parts of methyl ethyl ketone, and the mixture was heated to 55° C. and stirred. After the compounds were mixed uniformly, 23.2 parts of polymeric MDI (NCO content: 30.5 to 32.0%) was added, and the resultant mixture was heated to 60° C. and mixed. Then the mixture was cooled to 50° C., and 9.0 parts of triethylamine was added. The resultant mixture was further cooled to 30° C., and 4.5 parts of triethylamine was added to 244 parts of the cooled solution, and the resultant mixture was dispersed in 463 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin N containing 23% of non-volatile components.

Production Comparative Example 9

A four-necked flask equipped with a stirrer, a reflux condenser tube, a thermometer, and a nitrogen blowing tube was charged with 62.5 parts of a polyether polyol (a polyether polyol comprising bisphenol A component and propylene oxide component, number average molecular weight: 1,000, hydroxyl value: about 110 mg KOH/g), 9.0 parts of dimethylolpropionic acid, 10.5 parts of 1,6-hexanediol, 10.3 parts of neopentyl glycol, and 93.3 parts of methyl ethyl ketone, and the mixture was heated to 55° C. and stirred. After the compounds were mixed uniformly, 65.1 parts of hexamethylene diisocyanate was added, and the resultant mixture was heated to 70° C. and mixed. Then the mixture was cooled to 50° C., and 9.0 parts of triethylamine was added. The resultant mixture was further cooled to 30° C., and 4.5 parts of triethylamine was added to 260 parts of the cooled solution, and the resultant mixture was dispersed in 463 parts of water under vigorous stirring. After addition of all the compounds, the mixture was stirred at 40° C. for 30 minutes or longer (the mixture was stirred at 40° C. until no NCO was detected by IR spectroscopy, in order to completely consume the isocyanate groups through a reaction). Then methyl ethyl ketone was removed by evaporation under reduced pressure to thereby obtain a water-soluble/dispersible polyurethane resin O containing 25% of non-volatile components.

The formulations in respective Production Examples and respective Production Comparative Examples are shown in TABLEs 1 and 2.

TABLE 1

| | | | | PRODUCTION EXAMPLE NO. | | | | | | | | | | | | |
|---|---|---|---|---|---|---|---|---|---|---|---|---|---|---|---|---|
| | | | | 1 | 2 | 3 | 4 | 5 | 6 | 7 | 8 | 9 | 10 | 11 | 12 | 13 |
| | | | | WATER-SOLUBLE/DISPERSIBLE POLYURETHANE RESIN | | | | | | | | | | | | |
| | | | | A | B | C | D | E | F | P | Q | T | R | S | V | U |
| FORMU-LATION (PARTS BY MASS) | POLYOL | ALIPHATIC | POLY-ALKYLENE CARBONATE DIOL | 50.3 | 55.6 | 47.1 | — | — | — | — | — | — | 52.8 | 21.9 | — | — |
| | | | POLYESTER DIOL (ALIPHATIC) | — | — | — | 42.5 | — | — | — | — | — | — | 22.1 | — | — |
| | | | POLYETHER POLYOL (ALIPHATIC) | — | — | — | — | 42.5 | 48.5 | — | — | 21.3 | — | — | 37.8 | 23.7 |
| | | | DI-METHYLOL-PROPIONIC ACID | 4.9 | 5.4 | 4.6 | 5.7 | 5.7 | 5.7 | 5.9 | 5.7 | 5.7 | 5.1 | 5.8 | 5.9 | 6.4 |
| | | | 1,6-HEXANEDIOL | 3.4 | 3.8 | 3.2 | 4.5 | 4.5 | 5.1 | 7.9 | 11.0 | 4.5 | 3.6 | 4.4 | 12.0 | 5.0 |
| | | | NEOPENTYL GLYCOL | 3.0 | 3.3 | 2.8 | 3.9 | 3.9 | 4.5 | 7.2 | 10.6 | 3.9 | 3.2 | 3.3 | 11.7 | 4.4 |
| | | AROMATIC | POLYETHER POLYOL (AROMATIC) | — | — | — | — | — | — | 34.8 | 19.8 | 21.3 | — | — | — | 23.7 |
| | | | POLYESTER DIOL (AROMATIC) | — | — | — | — | — | — | — | — | — | — | — | — | — |
| | POLY-ISO-CYANATE | ALIPHATIC | ALICYCLIC ISOPHORONE DI-CYANATE | 38.4 | — | — | 43.4 | 43.4 | — | — | — | 43.4 | 20.1 | 42.4 | — | — |
| | | | DICYCLOHEXYL-METHANE-4,4-DIISOCYANATE | — | — | 42.3 | — | — | — | — | — | — | — | — | — | — |
| | | | HEXAMETHYLENE DIISOCYANATE | — | 32.0 | — | — | — | 36.3 | 44.1 | 52.8 | — | 15.2 | — | 12.1 | 36.8 |
| | | AROMATIC | POLYMERIC MDI | — | — | — | — | — | — | — | — | — | — | — | 20.5 | — |
| | | | TOLUENE DIISOCYANATE | — | — | — | — | — | — | — | — | — | — | — | — | — |
| ALIPHATIC POLYOL + ALIPHATIC POLYISOCYANATE (% BY MASS) | | | | 100.0 | 100.0 | 100.0 | 100.0 | 100.0 | 100.0 | 65.2 | 80.2 | 78.7 | 100.0 | 100.0 | 79.5 | 76.3 |
| AROMATIC POLYOL + AROMATIC POLYISOCYANATE (% BY MASS) | | | | 0.0 | 0.0 | 0.0 | 0.0 | 0.0 | 0.0 | 34.8 | 19.8 | 21.3 | 0.0 | 0.0 | 20.5 | 23.7 |

TABLE 2

| | | | | PRODUCTION EXAMPLE NO. | | | | | | | | |
|---|---|---|---|---|---|---|---|---|---|---|---|---|
| | | | | 1 | 2 | 3 | 4 | 5 | 6 | 7 | 8 | 9 |
| | | | | WATER-SOLUBLE/DISPERSIBLE POLYURETHANE RESIN | | | | | | | | |
| | | | | G | H | I | J | K | L | M | N | O |
| FORMULATION (PARTS BY MASS) | POLYOL | ALIPHATIC | | POLYALKYLENE CARBONATE DIOL | 25.2 | 21.1 | — | — | — | — | — | — | — |
| | | | | POLYESTER DIOL (ALIPHATIC) | — | — | — | — | 23.0 | — | — | — | — |
| | | | | POLYETHER POLYOL (ALIPHATIC) | — | — | — | — | — | 23.0 | — | — | — |
| | | | | DIMETHYLOLPROPIONIC ACID | 5.6 | 5.3 | 5.7 | 6.0 | 5.9 | 5.9 | 5.4 | 5.6 | 5.7 |
| | | | | 1,6-HEXANEDIOL | 14.5 | 10.5 | 4.5 | 4.8 | 15.8 | 15.8 | 6.8 | 8.1 | 6.7 |
| | | | | NEOPENTYL GLYCOL | 14.5 | 10.5 | 3.9 | 4.2 | 15.8 | 15.8 | 5.5 | 6.5 | 6.5 |
| | | AROMATIC | | POLYETHER POLYOL (AROMATIC) | — | — | 42.5 | — | — | — | 55.0 | — | 39.7 |
| | | | | POLYESTER DIOL (AROMATIC) | — | — | — | 45.0 | — | — | — | 63.4 | — |
| | POLYISOCYANATE | ALIPHATIC | ALICYCLIC | ISOPHORONE DIISOCYANATE | — | — | 43.4 | 40.0 | — | — | — | — | — |
| | | | | DICYCLOHEXYL-METHANE-4,4-DIISOCYANATE | — | — | — | — | — | — | — | — | — |
| | | | | HEXAMETHYLENE DIISOCYANATE | — | — | — | — | — | — | — | — | 41.4 |
| | | AROMATIC | | POLYMERIC MDI | 40.3 | — | — | — | 39.6 | 39.6 | 27.4 | 16.3 | — |
| | | | | TOLUENE DIISOCYANATE | — | 52.6 | — | — | — | — | — | — | — |
| ALIPHATIC POLYOL + ALIPHATIC POLYISOCYANATE (% BY MASS) | | | | | 59.7 | 47.4 | 57.5 | 55.0 | 60.4 | 60.4 | 17.6 | 20.3 | 60.3 |
| AROMATIC POLYOL + AROMATIC POLYISOCYANATE (% BY MASS) | | | | | 40.3 | 52.6 | 42.5 | 45.0 | 39.6 | 39.6 | 82.4 | 79.7 | 39.7 |

Example 1

6.3 Parts (1.8 parts based on solid content), based on solid content, of the water-soluble/dispersible polyurethane resin A obtained in Production Example 1, 35 parts of a potassium fluoroaluminate-based flux, and 58.7 parts of water were mixed to thereby obtain an aqueous aluminum brazing composition with a solid concentration of 36%.

Examples 2 to 27

The water-soluble/dispersible polyurethane resins obtained in Production Examples 1 to 13 and fluxes shown in the tables were used at the ratios (parts by mass) shown in the tables to prepare aqueous aluminum brazing compositions including these components dispersed in water in the same manner as in Example 1.

Comparative Examples 1 to 9

The water-soluble/dispersible polyurethane resins obtained in Production Comparative Examples 1 to 9 and fluxes shown in the tables were used at the ratios (parts by mass) shown in the tables to prepare aqueous aluminum brazing compositions including these components dispersed in water in the same manner as in Example 1.

Evaluation

<Thermal Decomposition Properties>

Each of the binder resins was dried in air, then heated from 30° C. to 520° C. in a nitrogen atmosphere at a temperature rise rate of 20° C./minute using a differential thermobalance (Thermo plus TG8120 manufactured by Rigaku Corporation), and held at 520° C. for 10 minutes to measure a change in the weight of the binder resin by heat. The results are shown in TABLEs 3 to 6.

The criteria for evaluation are as follows.

A: The residual ratio in a 400° C. heating environment was 60% by mass or less, and the residual ratio in a 520° C. heating environment was 0.7% by mass or less.

B: The residual ratio in a 400° C. heating environment was 60% by mass or less, and the residual ratio in a 520° C. heating environment was more than 0.7% by mass and 1.0% by mass or less.

C: The residual ratio in a 400° C. heating environment was more than 60% by mass, and/or the residual ratio in a 520° C. heating environment was more than 1.0% by mass.

<Brazability in Open Space>

Aluminum members (JIS-A1050, 60 mm×25 mm×1.0 mm, application amount: 10 g/m² based on solid content) to which the aqueous aluminum brazing compositions in the respective Examples and the respective Comparative Examples had been applied were used as horizontal members. Brazing sheets prepared by cladding an aluminum alloy containing 1.2% of manganese and 2.5% of zinc with a silicon-aluminum alloy (a brazing material) were used as vertical members (55 mm×25 mm×0.2 mm).

First, the vertical members were attached to the horizontal members by the intermediary of the aqueous aluminum brazing compositions into an inverted T-shape and secured using stainless steel wires to thereby produce test pieces for brazing evaluation.

Next, each of the test pieces was heated and brazed in a nitrogen atmosphere (oxygen concentration: 100 ppm or less) at 605° C. using an atmosphere-type box electric furnace (A(V)-BC-M manufactured by NORITAKE TCF Co., Limited). Then brazability was evaluated. The results are shown in TABLEs 3 to 6.

The criteria for the evaluation are as follows.

A: Perfect fillets of 20 mm or more were formed on both sides, and sufficient joining strength was obtained.

B: Fillets of 10 mm or more and 20 mm or less were formed on both sides, but the joining strength was low.

C: Fillets were less than 10 mm or were not formed, and joining was not achieved because brazing was incomplete.

<Appearance in Open Space after Brazing>

One of the aqueous aluminum brazing compositions (0.03 g) in the respective Examples and the respective Comparative Examples was applied with a brush to a 35 mm×35 mm aluminum plate (JIS-A1050) to obtain a test piece.

After the test piece was dried in air, the test piece was heated from 30° C. to 605° C. over about 10 minutes in a nitrogen atmosphere (oxygen concentration: 100 ppm or less) using an atmosphere-type box electric furnace (A(V)-BC-M manufactured by NORITAKE TCF Co., Limited). The appearance of the test piece after heating was observed and evaluated. The results are shown in TABLEs 3 to 6.

The criteria for the evaluation are as follows.

A: No darkening due to the binder resin was found at all.

B: Darkening due to the binder resin was found in part of the test piece.

C: Darkening due to the binder resin was clearly found over the entire test piece.

<Brazability in Substantially Closed Space>

Aluminum members (JIS-A1050, 60 mm×25 mm×1.0 mm, application amount: 10 g/m² based on solid content) to which the aqueous aluminum brazing compositions in the respective Examples and the respective Comparative Examples had been applied were used as horizontal members. Brazing sheets prepared by cladding an aluminum alloy containing 1.2% of manganese and 2.5% of zinc with a silicon-aluminum alloy (a brazing material) were used as vertical members (55 mm×25 mm×0.2 mm).

First, the vertical members were attached to the horizontal members by the intermediary of the aqueous aluminum brazing compositions into an inverted T-shape and secured using stainless steel wires to thereby produce test pieces for brazing evaluation.

Next, the test piece was covered with an SUS cup having an inner diameter of 10.5 cm and a height of 5.5 cm and heated and brazed at 605° C. in a nitrogen atmosphere (oxygen concentration: 100 ppm or less) using an atmosphere-type box electric furnace (A(V)-BC-M manufactured by NORITAKE TCF Co., Limited). Then the brazability was evaluated. The results are shown in TABLES 3 to 6.

The criteria for the evaluation are as follows.

A: Perfect fillets of 20 mm or more were formed on both sides, and sufficient joining strength was obtained.

B: Fillets of 10 mm or more and 20 mm or less were formed on both sides, but the joining strength was low.

C: Fillets were less than 10 mm or were not formed, and joining was not achieved because brazing was incomplete.

<Appearance after Brazing in Substantially Closed Space>

One of the aqueous aluminum brazing compositions (0.03 g) in the respective Examples and the respective Comparative Examples was applied with a brush to a 35 mm×35 mm aluminum plate (JIS-A1050) to obtain a test piece.

Then the test piece was dried in air, covered with an SUS cup having an inner diameter of 5 cm and a height of 5.5 cm, inserted into an atmosphere-type box electric furnace (A(V)-BC-M manufactured by NORITAKE TCF Co., Limited), and heated from 30° C. to 605° C. over about 10 minutes in a nitrogen atmosphere (oxygen concentration: 100 ppm or less). The appearance of the test piece after heating was observed and evaluated. The results are shown in TABLEs 3 to 6.

The criteria for the evaluation are as follows.

A: No darkening due to the binder resin was found at all.

B: Darkening due to the binder resin was found in part of the test piece.

C: Darkening due to the binder resin was clearly found over the entire test piece.

<Storage Stability>

150 g of one of the aqueous aluminum brazing compositions obtained in the respective Examples and the respective Comparative Examples was placed in a 200 cc glass bottle and left to stand at 23° C. for 2 months. A change from the initial state was visually checked, and a comparative evaluation was made according to the following criteria.

The criteria for the evaluation are as follows.

A: No separation and precipitation of the components were found, and the components could be dispersed by inverting the glass bottle 50 times.

B: No separation and precipitation of the components were found. Although the components could not be dispersed by inverting the glass bottle 50 times, they could be dispersed by mechanical stirring (using a homo-mixer (TK ROBOMICS manufactured by Tokushu Kika Kogyo Co., Ltd.) at 1,400 rpm for 1 minute).

C: Separation and precipitation of the components were found. The components could not be easily dispersed even by mechanical stirring (using a homo-mixer (TK ROBOMICS manufactured by Tokushu Kika Kogyo Co., Ltd.) at 1,400 rpm for 1 minute).

<Overall Judgment>

An overall judgment was made using the above evaluation results. The criteria for the judgment are as follows.

A: All the evaluation results were "A."

B: The evaluation results were not "C," and at least one of the evaluation results was "B."

C: At least one of the evaluation results was "C."

TABLE 3

| | | | EXAMPLE NO. | | | | | | | | |
|---|---|---|---|---|---|---|---|---|---|---|---|
| | | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
| FORMULATION (PARTS BY MASS) | BINDER RESIN | WATER-SOLUBLE/DISPERSIBLE POLYURETHANE RESIN A | 1.8 | 1.1 | 3.9 | 8.8 | 1.8 | 1.8 | 1.8 | 0.5 | 3.1 |

TABLE 3-continued

|  |  |  | EXAMPLE NO. | | | | | | | | |
|---|---|---|---|---|---|---|---|---|---|---|---|
|  |  |  | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|  | FLUX | POTASSIUM FLUORO-ALUMINATE | 35.0 | 35.0 | 35.0 | 35.0 | 35.0 | 35.0 | 35.0 | 10.0 | 59.0 |
|  | WATER-MISCIBLE SOLVENT | WATER | 63.2 | 63.9 | 61.1 | 56.2 | 60.2 | 48.2 | 43.2 | 89.5 | 37.9 |
|  |  | WATER-SOLUBLE ALCOHOL | — | — | — | — | 3.0 | 15.0 | 20.0 | — | — |
| EVALUATION | THERMAL DECOMPOSITION PROPERTIES | RESIDUAL RATIO IN 400° C. HEATING ENVIRONMENT | 2.2 | 2.2 | 2.2 | 2.2 | 2.2 | 2.2 | 2.2 | 2.2 | 2.2 |
|  |  | RESIDUAL RATIO IN 520° C. HEATING ENVIRONMENT | 0 | 0 | 0 | 0 | 0 | 0 | 0 | 0 | 0 |
|  |  | EVALUATION | A | A | A | A | A | A | A | A | A |
|  | OPEN SPACE | BRAZABILITY | A | A | A | A | A | A | A | A | A |
|  |  | APPEARANCE | A | A | A | A | A | A | A | A | A |
|  | CLOSED SPACE | BRAZABILITY | A | A | A | A | A | A | A | A | A |
|  |  | APPEARANCE | A | A | A | A | A | A | A | A | A |
|  | STORAGE STABILITY |  | A | A | A | A | A | A | A | A | A |
|  | OVERALL EVALUATION |  | A | A | A | A | A | A | A | A | A |

TABLE 4

|  |  |  | EXAMPLE NO. | | | | | | | | |
|---|---|---|---|---|---|---|---|---|---|---|---|
|  |  |  | EXAMPLE 10 | EXAMPLE 11 | EXAMPLE 12 | EXAMPLE 13 | EXAMPLE 14 | EXAMPLE 15 | EXAMPLE 16 | EXAMPLE 17 | EXAMPLE 18 |
| FORMULATION (PARTS BY MASS) | BINDER RESIN | WATER-SOLUBLE/DISPERSIBLE POLYURETHANE RESIN A | 1.8 | 1.8 | — | — | — | — | — | 0.03 | 14.0 |
|  |  | WATER-SOLUBLE/DISPERSIBLE POLYURETHANE RESIN B | — | — | 1.8 | — | — | — | — | — | — |
|  |  | WATER-SOLUBLE/DISPERSIBLE POLYURETHANE RESIN C | — | — | — | 1.8 | — | — | — | — | — |
|  |  | WATER-SOLUBLE/DISPERSIBLE POLYURETHANE RESIN D | — | — | — | — | 1.8 | — | — | — | — |
|  |  | WATER-SOLUBLE/DISPERSIBLE POLYURETHANE RESIN E | — | — | — | — | — | 1.8 | — | — | — |

TABLE 4-continued

| | | | EXAMPLE NO. | | | | | | | | |
|---|---|---|---|---|---|---|---|---|---|---|---|
| | | | EXAMPLE 10 | EXAMPLE 11 | EXAMPLE 12 | EXAMPLE 13 | EXAMPLE 14 | EXAMPLE 15 | EXAMPLE 16 | EXAMPLE 17 | EXAMPLE 18 |
| | | WATER-SOLUBLE/DISPERSIBLE POLYURETHANE RESIN F | — | — | — | — | — | — | 1.8 | — | — |
| | FLUX | POTASSIUM FLUOROALUMINATE | — | — | 35.0 | 35.0 | 35.0 | 35.0 | 35.0 | 10.0 | 59.0 |
| | | POTASSIUM FLUOROALUMINATE-CESIUM COMPLEX | 35.0 | — | — | — | — | — | — | — | — |
| | | POTASSIUM FLUOROALUMINATE-LITHIUM COMPLEX | — | 35.0 | — | — | — | — | — | — | — |
| | WATER-MISCIBLE SOLVENT | WATER | 63.2 | 63.2 | 63.2 | 63.2 | 63.2 | 63.2 | 63.2 | 89.97 | 27.0 |
| EVALUATION | THERMAL DECOMPOSITION PROPERTIES | RESIDUAL RATIO IN 400° C. HEATING ENVIRONMENT | 2.2 | 2.2 | 4.4 | 2.6 | 5.3 | 6.3 | 6.5 | 2.2 | 2.2 |
| | | RESIDUAL RATIO IN 520° C. HEATING ENVIRONMENT | 0 | 0 | 0.3 | 0 | 0.1 | 0.2 | 0.5 | 0 | 0 |
| | | EVALUATION | A | A | A | A | A | A | A | A | A |
| | OPEN SPACE | BRAZABILITY | A | A | A | A | A | B | B | A | A |
| | | APPEARANCE | A | A | A | A | A | B | B | A | A |
| | CLOSED SPACE | BRAZABILITY | A | A | B | A | B | B | B | A | A |
| | | APPEARANCE | A | A | B | A | B | B | B | A | A |
| | STORAGE STABILITY | | A | A | A | A | A | A | A | A | A |
| | OVERALL EVALUATION | | A | A | B | A | B | B | B | A | A |

TABLE 5

| | | | EXAMPLE NO. | | | | | | | | |
|---|---|---|---|---|---|---|---|---|---|---|---|
| | | | EXAMPLE 19 | EXAMPLE 20 | EXAMPLE 21 | EXAMPLE 22 | EXAMPLE 23 | EXAMPLE 24 | EXAMPLE 25 | EXAMPLE 26 | EXAMPLE 27 |
| FORMULATION (PARTS BY MASS) | BINDER RESIN | WATER-SOLUBLE/DISPERSIBLE POLYURETHANE RESIN A | 3.7 | — | — | — | — | — | — | — | 1.8 |
| | | WATER-SOLUBLE/DISPERSIBLE POLYURETHANE RESIN R | — | 1.8 | — | — | — | — | — | — | — |
| | | WATER-SOLUBLE/DISPERSIBLE POLYURETHANE RESIN S | — | — | 1.8 | — | — | — | — | — | — |
| | | WATER-SOLUBLE/DISPERSIBLE POLY- | — | — | — | 1.8 | — | — | — | — | — |

TABLE 5-continued

| | | | EXAMPLE 19 | EXAMPLE 20 | EXAMPLE 21 | EXAMPLE 22 | EXAMPLE 23 | EXAMPLE 24 | EXAMPLE 25 | EXAMPLE 26 | EXAMPLE 27 |
|---|---|---|---|---|---|---|---|---|---|---|---|
| | | URETHANE RESIN V | — | — | — | — | 1.8 | — | — | — | — |
| | | WATER-SOLUBLE/DISPERSIBLE POLYURETHANE RESIN U | — | — | — | — | — | 1.8 | — | — | — |
| | | WATER-SOLUBLE/DISPERSIBLE POLYURETHANE RESIN P | — | — | — | — | — | — | 1.8 | — | — |
| | | WATER-SOLUBLE/DISPERSIBLE POLYURETHANE RESIN Q | — | — | — | — | — | — | — | 1.8 | — |
| | | WATER-SOLUBLE/DISPERSIBLE POLYURETHANE RESIN T | — | — | — | — | — | — | — | — | — |
| | FLUX | POTASSIUM FLUOROALUMINATE | 70.0 | 35.0 | 35.0 | 35.0 | 35.0 | 35.0 | 35.0 | 35.0 | — |
| | | POTASSIUM FLUOROZINCATE | — | — | — | — | — | — | — | — | 35.0 |
| | WATER-MISCIBLE SOLVENT | WATER | 26.3 | 63.2 | 63.2 | 63.2 | 63.2 | 63.2 | 63.2 | 63.2 | 63.2 |
| EVALUATION | THERMAL DECOMPOSITION PROPERTIES | RESIDUAL RATIO IN 400° C. HEATING ENVIRONMENT | 2.2 | 3.2 | 3.5 | 6.9 | 7.2 | 8.4 | 7.8 | 7.0 | 2.2 |
| | | RESIDUAL RATIO IN 520° C. HEATING ENVIRONMENT | 0 | 0.2 | 0.1 | 0.7 | 0.7 | 1.0 | 0.8 | 0.5 | 0 |
| | | EVALUATION | A | A | A | A | A | B | B | A | A |
| | OPEN SPACE | BRAZABILITY | A | A | A | B | B | B | B | B | A |
| | | APPEARANCE | A | A | A | B | B | B | B | B | A |
| | CLOSED SPACE | BRAZABILITY | A | A | B | B | B | B | B | B | A |
| | | APPEARANCE | A | A | B | B | B | B | B | B | A |
| | STORAGE STABILITY | | A | A | A | B | B | B | B | B | A |
| | OVERALL EVALUATION | | A | A | B | B | B | B | B | B | A |

TABLE 6

| | | | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 | COMPARATIVE EXAMPLE 7 | COMPARATIVE EXAMPLE 8 | COMPARATIVE EXAMPLE 9 |
|---|---|---|---|---|---|---|---|---|---|---|---|
| FORMULATION (PARTS BY MASS) | BINDER RESIN | WATER-SOLUBLE/DISPERSIBLE POLYURETHANE RESIN G | 1.8 | — | — | — | — | — | — | — | — |

TABLE 6-continued

|  |  |  | COMPARATIVE EXAMPLE No. | | | | | | | | |
|---|---|---|---|---|---|---|---|---|---|---|---|
|  |  |  | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 | COMPARATIVE EXAMPLE 7 | COMPARATIVE EXAMPLE 8 | COMPARATIVE EXAMPLE 9 |
|  |  | WATER-SOLUBLE/DISPERSIBLE POLYURETHANE RESIN H | — | 1.8 | — | — | — | — | — | — | — |
|  |  | WATER-SOLUBLE/DISPERSIBLE POLYURETHANE RESIN I | — | — | 1.8 | — | — | — | — | — | — |
|  |  | WATER-SOLUBLE/DISPERSIBLE POLYURETHANE RESIN J | — | — | — | 1.8 | — | — | — | — | — |
|  |  | WATER-SOLUBLE/DISPERSIBLE POLYURETHANE RESIN K | — | — | — | — | 1.8 | — | — | — | — |
|  |  | WATER-SOLUBLE/DISPERSIBLE POLYURETHANE RESIN L | — | — | — | — | — | 1.8 | — | — | — |
|  |  | WATER-SOLUBLE/DISPERSIBLE POLYURETHANE RESIN M | — | — | — | — | — | — | 1.8 | — | — |
|  |  | WATER-SOLUBLE/DISPERSIBLE POLYURETHANE RESIN N | — | — | — | — | — | — | — | 1.8 | — |
|  |  | WATER-SOLUBLE/DISPERSIBLE POLYURETHANE RESIN O | — | — | — | — | — | — | — | — | 1.8 |
|  | FLUX | POTASSIUM FLUOROALUMINATE | 35.0 | 35.0 | 35.0 | 35.0 | 35.0 | 35.0 | 35.0 | 35.0 | 35.0 |
|  | WATER-MISCIBLE SOLVENT | WATER | 63.2 | 63.2 | 63.2 | 63.2 | 63.2 | 63.2 | 63.2 | 63.2 | 63.2 |
| EVALUATION | THERMAL DECOMPOSITION PROPERTIES | RESIDUAL RATIO IN 400° C. HEATING ENVIRONMENT | 30.7 | 20.6 | 9.4 | 7.3 | 32.0 | 47.2 | 48.4 | 33.1 | 10.6 |
|  |  | RESIDUAL RATIO IN 520° C. HEATING ENVIRONMENT | 7.9 | 5.1 | 2.0 | 1.4 | 7.6 | 8.0 | 9.7 | 9.2 | 2.0 |
|  |  | EVALUATION | C | C | C | C | C | C | C | C | C |
|  | OPEN SPACE | BRAZABILITY | C | C | C | C | C | C | C | C | C |
|  |  | APPEARANCE | C | C | C | C | C | C | C | C | C |

TABLE 6-continued

| | | COMPARATIVE EXAMPLE No. | | | | | | | | |
|---|---|---|---|---|---|---|---|---|---|---|
| | | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 | COMPARATIVE EXAMPLE 7 | COMPARATIVE EXAMPLE 8 | COMPARATIVE EXAMPLE 9 |
| CLOSED SPACE | BRAZABILITY | C | C | C | C | C | C | C | C | C |
| | APPEARANCE | C | C | C | C | C | C | C | C | C |
| STORAGE STABILTY | | C | C | C | C | C | C | C | C | C |
| OVERALL EVALUATION | | C | C | C | C | C | C | C | C | C |

The details of the water-miscible solvent in the tables are as follows.

Water-soluble alcohol: 3-methoxy-3-methyl-1-butanol

The invention described above is provided as exemplary embodiments of the present invention. However, these are merely examples and should not be construed as limiting. Modifications apparent to those skilled in the art are included in the claims of the present invention.

INDUSTRIAL APPLICABILITY

The aqueous aluminum brazing composition of the present invention is preferably used to braze (join) aluminum or aluminum alloy members in heat exchangers for vehicles (such as evaporators and condensers) and heat exchangers for home use (such as water heaters and air conditioners)

REFERENCE SIGNS LIST 1 inner fin tube
2 inner fin member
3 tube member
4 passage
5 contact portion

The invention claimed is:

1. An aqueous aluminum brazing composition comprising a binder resin being a water-soluble/dispersible polyurethane resin that exhibits a residual ratio of 60% by mass or less in a 400° C. heating environment and exhibits a residual ratio of 1.0% by mass or less in a 520° C. heating environment,
  wherein the water-soluble/dispersible polyurethane resin is a reaction product of at least a polyisocyanate and a polyol,
  wherein the polyol comprises an aliphatic polyol,
  wherein the aliphatic polyol comprises an aliphatic polyester polyol and/or an aliphatic polycarbonate polyol, and
  wherein the aqueous aluminum brazing composition further comprises a flux.

2. The aqueous aluminum brazing composition according to claim 1, wherein
  a ratio of the binder resin added is 0.03 parts by mass or more and 15 parts by mass or less with respect to 100 parts by mass of the aqueous aluminum brazing composition, and
  a ratio of the flux added is 10 parts by mass or more and 75 parts by mass or less with respect to 100 parts by mass of the aqueous aluminum brazing composition.

3. The aqueous aluminum brazing composition according to claim 1, wherein
  the polyisocyanate comprises an aliphatic polyisocyanate, and
  a total amount of the aliphatic polyisocyanate and the aliphatic polyol is 61 parts by mass or more with respect to 100 parts by mass of a total amount of the polyisocyanate and the polyol.

4. The aqueous aluminum brazing composition according to claim 1, wherein the aliphatic polyol comprises no aliphatic polyether polyol.

5. The aqueous aluminum brazing composition according to claim 1, wherein the aliphatic polyol comprises no aliphatic polyether polyol and no aliphatic polyester polyol and comprises an aliphatic polycarbonate polyol.

6. The aqueous aluminum brazing composition according to claim 3, wherein the aliphatic polyisocyanate comprises an alicyclic polyisocyanate.

7. The aqueous aluminum brazing composition according to claim 6, wherein a content of the alicyclic polyisocyanate is 40 parts by mass or more with respect to 100 parts by mass of a total amount of the polyisocyanate.

8. The aqueous aluminum brazing composition according to claim 1, wherein the polyol further comprises a carboxy group-containing polyol.

9. The aqueous aluminum brazing composition according to claim 1, wherein the aqueous aluminum brazing composition is used for brazing of aluminum and/or an aluminum alloy in a substantially closed space.

* * * * *